(12) United States Patent
Kim et al.

(10) Patent No.: US 9,401,820 B2
(45) Date of Patent: Jul. 26, 2016

(54) METHOD FOR TRANSMITTING MTC DATA IN A MOBILE COMMUNICATION SYSTEM

(75) Inventors: Hyunsook Kim, Gyeonggi-Do (KR); Taehyeon Kim, Gyeonggi-Do (KR); Laeyoung Kim, Gyeonggi-Do (KR); Saso Stojanovski, Paris (FR); Arnaud Vedrine, Paris (FR)

(73) Assignee: LG Electronics Inc., Seoul (KR)

( * ) Notice: Subject to any disclaimer, the term of this patent is extended or adjusted under 35 U.S.C. 154(b) by 1052 days.

(21) Appl. No.: 13/520,213

(22) PCT Filed: Feb. 11, 2011

(86) PCT No.: PCT/KR2011/000954
§ 371 (c)(1),
(2), (4) Date: Jul. 2, 2012

(87) PCT Pub. No.: WO2011/099821
PCT Pub. Date: Aug. 18, 2011

(65) Prior Publication Data
US 2012/0282956 A1    Nov. 8, 2012

Related U.S. Application Data

(60) Provisional application No. 61/303,659, filed on Feb. 11, 2010, provisional application No. 61/357,084, filed on Jun. 21, 2010, provisional application No. 61/357,974, filed on Jun. 23, 2010, provisional application No. 61/359,355, filed on Jun. 29, 2010.

(30) Foreign Application Priority Data

Oct. 29, 2010  (KR) .................. 10-2010-0107282
Oct. 29, 2010  (KR) .................. 10-2010-0107283

(51) Int. Cl.
*H04W 4/00*     (2009.01)
*H04L 12/26*    (2006.01)
*H04L 12/58*    (2006.01)

(52) U.S. Cl.
CPC ............ *H04L 12/5895* (2013.01); *H04L 51/38* (2013.01); *H04L 2212/00* (2013.01); *H04W 4/00* (2013.01)

(58) Field of Classification Search
CPC .............................. H04W 28/08; H04L 47/35
USPC .......................................... 455/466; 370/235
See application file for complete search history.

(56) References Cited

U.S. PATENT DOCUMENTS

| | | | | |
|---|---|---|---|---|
| 2007/0019643 | A1* | 1/2007 | Shaheen | H04W 60/00 370/389 |
| 2007/0156909 | A1* | 7/2007 | Osborn | H04L 67/16 709/227 |
| 2012/0087274 | A1* | 4/2012 | Meriau | H04W 4/00 370/253 |

OTHER PUBLICATIONS

KPN, Sierra Wireless, "Key Issue—Offline Small Data Transmission," 3GPP TSG SA WG2 Meeting #77, S2-100097, Jan. 18-22, 2010.

(Continued)

*Primary Examiner* — Omoniyi Obayanju
(74) *Attorney, Agent, or Firm* — Morgan, Lewis & Bockius LLP

(57) ABSTRACT

The present invention relates to a mobile communication system, and more particularly relates to a method for transmitting a small-sized control signal (also known as "small data") using a control plane in a MTC (machine-type communication) service in a mobile communication system. In the present invention, MTC data is encapsulated in an existing control procedure or control message or the like, on a control signal, without performing packet data bearer setup, and the control signal having the encapsulated MTC data is sent between a network and a terminal, thereby optimizing network resource efficiency and reducing the wireless channel load.

19 Claims, 15 Drawing Sheets

(56) References Cited

OTHER PUBLICATIONS

Huawei, "Network Improvements for Small Data Transmissions," 3GPP TSG SA WG2 Meeting #77, S2-100244, Jan. 18-22, 2010.
ZTE, "Low Data Usage using SMS," 3GPP TSG SA WG2 Meeting #77, S2-100088, Jan. 18-22, 2010.
3GPP TR 23.888 VO.2.0, "3rd Generation Partnership Project; Technical Specification Group Services and System Aspects; System Improvements for machine-Type Communications; (Release 10)," Jan. 2010.
International Search Report issued in PCT/KR2011/000954 dated Oct. 25, 2011.

* cited by examiner

FIG. 6
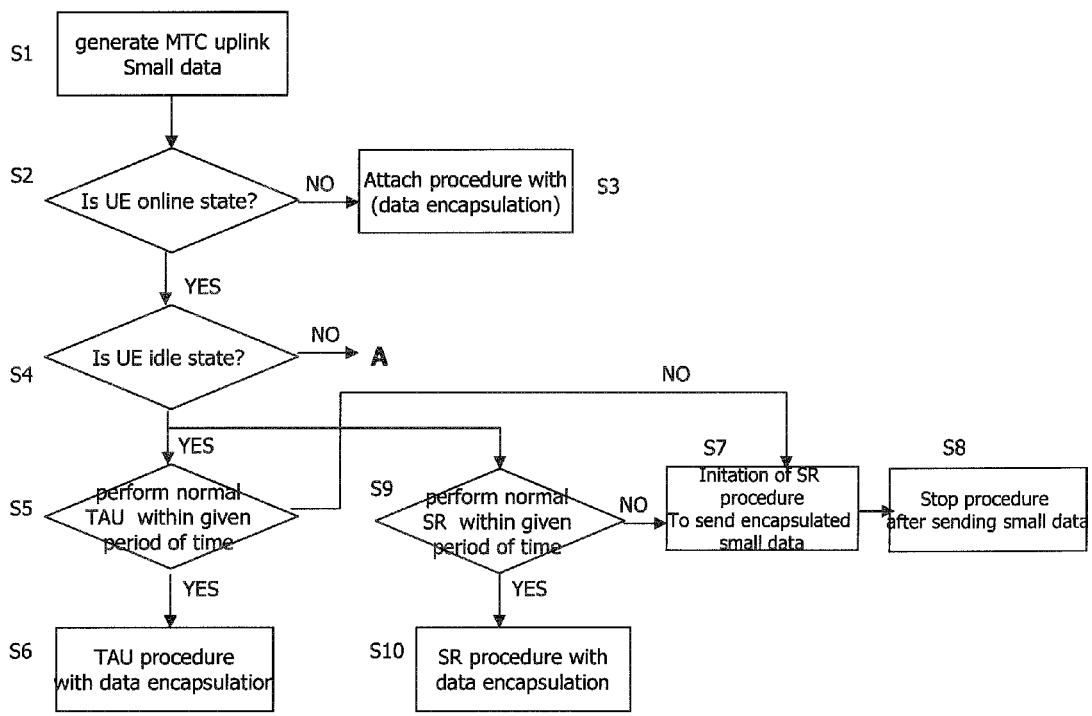
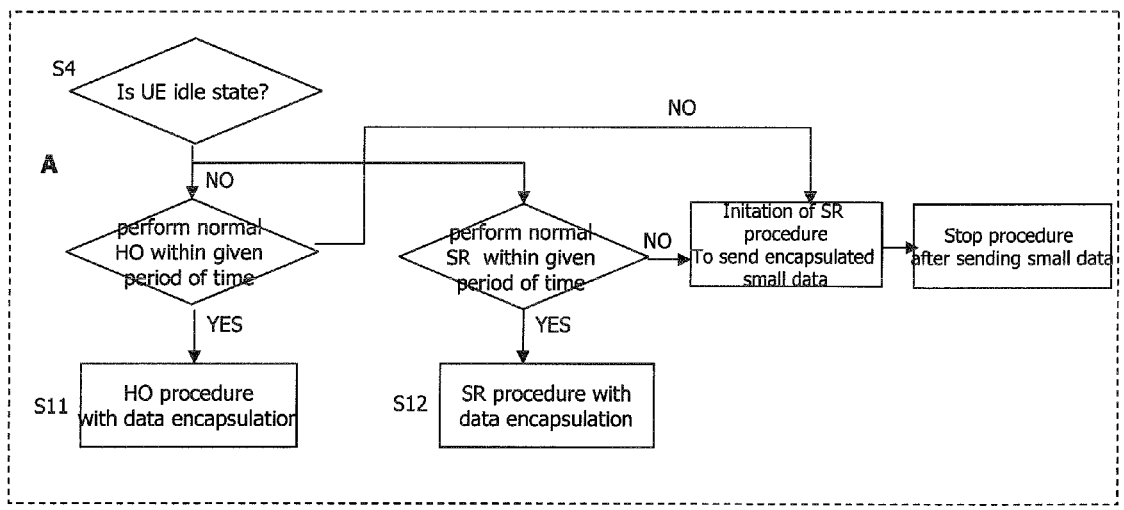

FIG. 7

| IEI | Information Element | Type/Reference | Presence | Format | Length |
|---|---|---|---|---|---|
|  | Protocol discriminator | Protocol discriminator 9.2 | M | V | 1/2 |
|  | Security header type | Security header type 9.3.1 | M | V | 1/2 |
|  | Tracking area update request message identity | Message type 9.8 | M | V | 1 |
|  | EPS update type | EPS update type 9.9.3.14 | M | V | 1/2 |
|  | NAS key set identifier | NAS key set identifier 9.9.3.21 | M | V | 1/2 |
|  | Old GUTI | EPS mobile identity 9.9.3.12 | M | LV | 12 |
| B- | Non-current native NAS key set identifier | NAS key set identifier 9.9.3.21 | O | TV | 1 |
| 8- | GPRS ciphering key sequence number | Ciphering key sequence number 9.9.3.4a | O | TV | 1 |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 55 | Nonce$_{UE}$ | Nonce 9.9.3.25 | O | TV | 5 |
| 58 | UE network capability | UE network capability 9.9.3.34 | O | TLV | 4-15 |
| 52 | Last visited registered TAI | Tracking area identity 9.9.3.32 | O | TV | 6 |
| 5C | DRX parameter | DRX parameter 9.9.3.8 | O | TV | 3 |
| A- | UE radio capability information update needed | UE radio capability information update needed 9.9.3.35 | O | TV | 1 |
| 57 | EPS bearer context status | EPS bearer context status 9.9.2.1 | O | TLV | 4 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |
| 27 | Protocol Configuration Options (new defined field) | Protocol configuration options 9.9.4.11 | O | TLV | 3-253 |

FIG. 8

| bits | 4 3 2 1 |
|---|---|
| 0 0 0 0 | group call control |
| 0 0 0 1 | broadcast call control |
| 0 0 1 0 | EPS session management messages |
| 0 0 1 1 | call control; call related SS messages |
| 0 1 0 0 | GPRS Transparent Transport Protocol (GTTP) |
| 0 1 0 1 | mobility management messages |
| 0 1 1 0 | radio resources management messages |
| 0 1 1 1 | EPS mobility management messages |
| 1 0 0 0 | GPRS mobility management messages |
| 1 0 0 1 | SMS messages |
| 1 0 1 0 | GPRS session management messages |
| 1 0 1 1 | non call related SS messages |
| 1 1 0 0 | Location services specified in 3GPP TS 44.071 [8a] |
| 1 1 1 0 | reserved for extension of the PD to one octet length |
| 1 1 1 1 | used by tests procedures described in 3GPP TS 44.014 [5a], 3GPP TS 3 4.109 [17a] and 3GPP TS 36.509 [26]. |

Table : Protocol discriminator values

FIG. 9

| 8 | 7 | 6 | 5 | 4 | 3 | 2 | 1 | |
|---|---|---|---|---|---|---|---|---|
| Protocol configuration options IEI | | | | | | | | octet 1 |
| Length of protocol config. options contents | | | | | | | | octet 2 |
| 1 ext | 0 | 0 0 0 Spare | | | Configuration protocol | | | octet 3 |
| Protocol ID 1 | | | | | | | | octet 4 octet 5 |
| Length of protocol ID 1 contents | | | | | | | | octet 6 |
| Protocol ID 1 contents | | | | | | | | octet 7 octet m |
| Protocol ID 2 | | | | | | | | octet m+1 octet m+2 |
| Length of protocol ID 2 contents | | | | | | | | octet m+3 |
| Protocol ID 2 contents | | | | | | | | octet m+4 octet n |
| . .. | | | | | | | | octet n+1 octet u |
| Protocol ID n-1 | | | | | | | | octet u+1 octet u+2 |
| Length of protocol ID n-1 contents | | | | | | | | octet u+3 |
| Protocol ID n-1 contents | | | | | | | | octet u+4 octet v |
| Protocol ID n | | | | | | | | octet v+1 octet v+2 |
| Length of protocol ID n contents | | | | | | | | octet v+3 |
| Protocol ID n contents | | | | | | | | octet v+4 octet w |
| Container ID 1 | | | | | | | | octet w+1 octet w+2 |
| Length of container ID 1 contents | | | | | | | | octet w+3 |
| Container ID 1 contents | | | | | | | | octet w+4 octet x |
| . . . | | | | | | | | octet x+1 octet y |
| Container ID n | | | | | | | | octet y+1 octet y+2 |
| Length of container ID n contents | | | | | | | | octet y+3 |
| Container ID n contents | | | | | | | | octet y+4 octet z |

*Protocol configuration options* information element

FIG. 13
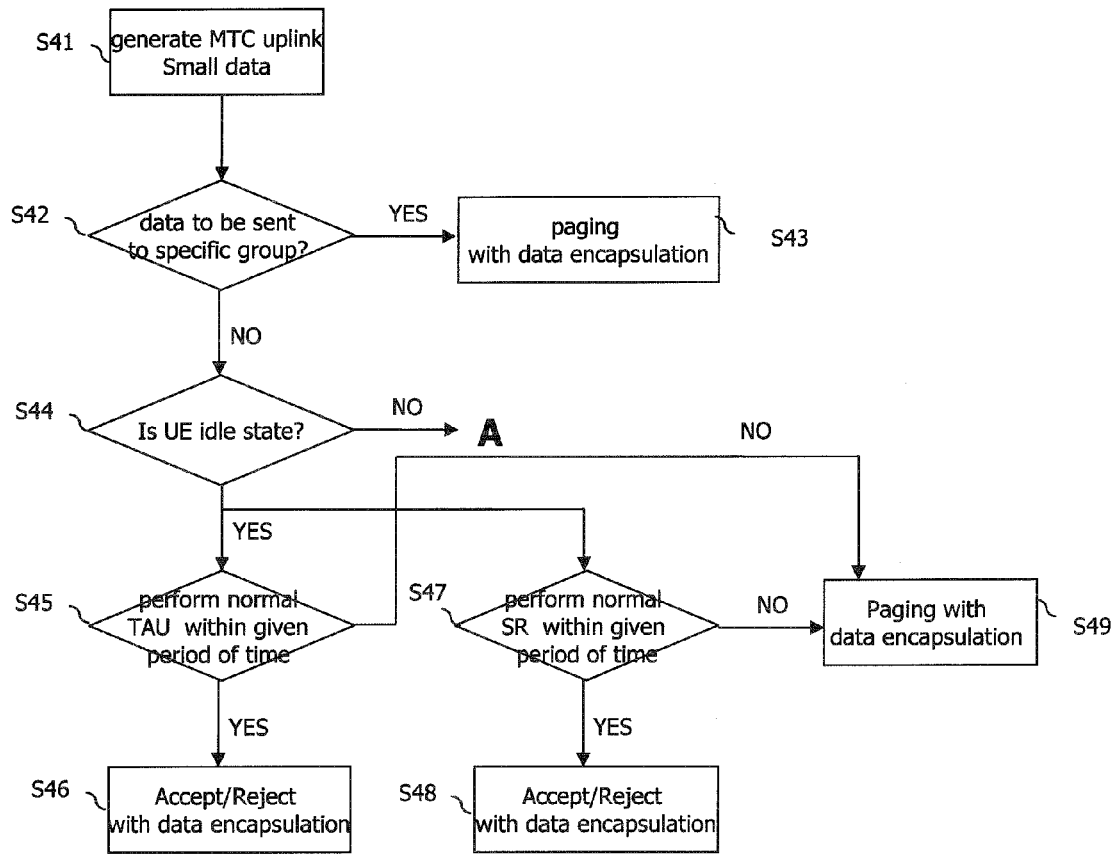
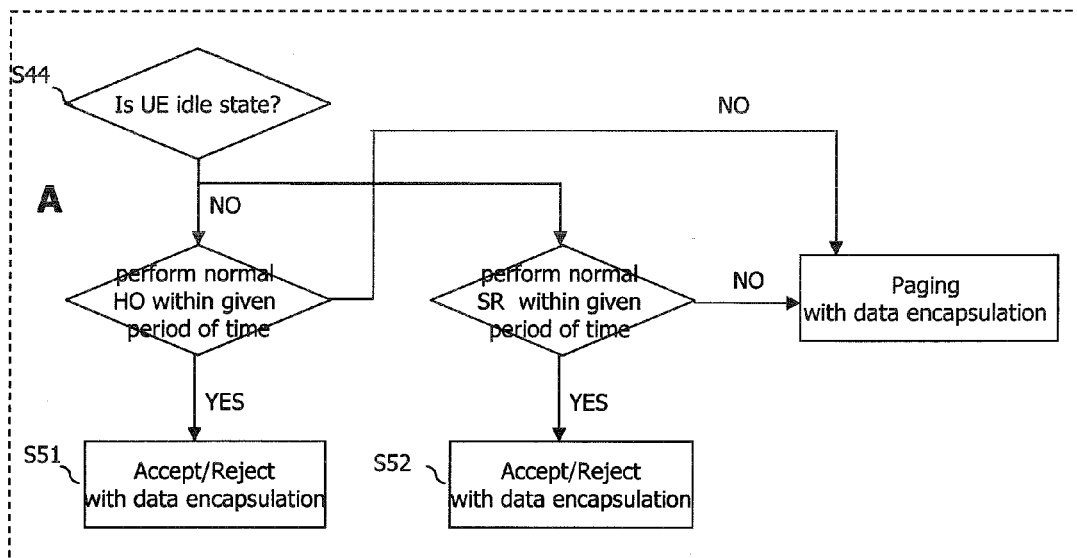

METHOD FOR TRANSMITTING MTC DATA IN A MOBILE COMMUNICATION SYSTEM

This is a U.S. National Phase Entry of PCT Application No. PCT/KR2011/000954, filed Feb. 11, 2011, and claims the benefit of Korean Patent Application No. 10-2010-0107283 and 10-2010-0107282 both filed Oct. 29,2010 and claims the benefit of U.S. Provisional Application Nos. 61/303,659 filed Feb. 12, 2010, 61/357,084 filed Jun. 21, 2010, 61/357,974 filed Jun. 23, 2010 and 61/359,355 filed Jun. 29,2010.

TECHNICAL FIELD

The present invention relates to a mobile communication system, and more particularly, to a method for transmitting a small-sized control signal (also known as "small data") using a control plane in a MTC (machine-type communication) service in a mobile communication system.

BACKGROUND ART

In order to meet a variety of forums and new technologies related to the 4th generation mobile communications, the 3rd Generation Partnership Project (3GPP) which aims to provide technical specifications of the 3rd generation mobile communications system has proceeded with research for the Long Term Evolution/Evolved Packet Core (LTE/ETC) technologies since year-end 2004 as a part of efforts to optimize and enhance performances of the 3GPP technologies. The LTE mainly led by the 3GPP SA WG2 relates to research of network technologies which aims to determine a network structure together with the LTE work of the 3GPP TSG RAN and to support mobility between networks of different versions. Recently, the LTE has been considered one of the essential standardization issues of the 3GPP. Such work is to develop the 3GPP to be a system based on the IP and supporting a variety of radio (wireless) connection technologies, and has progressed with the aim of an optimized packet-based system capable of minimizing a transmission delay with enhanced data transmission capability.

Hereinafter, the technical terms used in the present invention will be explained.

MTC function indicates a function to support communications between MTC devices or communications between an MTC device and an MTC server, by which communication is established without human interference, unlike human-to-human connections. Examples of MTC applications may include communications between an automatic vending machine and a server, between a POS (Point of Service) device and a server, and between a water or electricity meter reader and a server. As used herein, the device involved is referred to as an MTC device. As used herein, MTC is also called the name of Machine to Machine communication or object communication.

TA (tracking area) indicates an area to which E-UTRAN provides a service, and includes one or more E-UTRAN cells.

RA (routing area) indicates an area to which GERAN/UTRAN provides a service, and includes one or more GERAN/UTRAN cell.

TAI (Tracking Area Identity) list indicates a list of TAIs that identify the tracking areas a UE can enter without performing a tracking area updating procedure. The TAIs in a TAI list assigned by an MME to a UE pertain to the same MME area. The TAI list has been defined in 3GPP TS 24.301 v9.1.0, and thus detailed explanations thereof will be omitted.

MME (Mobility Management Entity) area indicates a part of a network served by an MME. The MME area consists of one or several Tracking Areas. All cells served by one eNodeB are included in one MME Area. The MME area has been defined in 3GPP TS 23.002 v9.2.0, and thus detailed explanations thereof will be omitted.

UMTS: It is an abbreviation of Universal Mobile Telecommunication System and denotes the 3rd mobile communication network.

EPS: It is an abbreviation of Evolved Packet System, and denotes a core network supporting a Long Term Evolution (LTE) network. It is a network in the form of an evolved UMTS.

NodeB: It is installed outdoors as a base station of the UMTS network, and the size of the cell coverage corresponds to a macro cell.

eNodeB: It is installed outdoors as a base station of the Evolved Packet Core (EPC) network, and the size of the cell coverage corresponds to a macro cell.

UE/MS: User Equipment. It denotes a terminal device.

IMSI: International Mobile Subscriber Identity. It is a unique identifier that is internationally and uniquely assigned to a user in a mobile communication network.

SIM card: Subscriber Identity Module card. It stores user subscriber information such as IMSI.

UICC: Universal Integrated Circuit Card. It has the same meaning as SIM card.

MTC: Machine Type Communication. It occurs between machines without human interference.

MTC device: A UE that performs a specific object with a communication function over a core network. Examples of which include a vending machine and a meter reading machine.

MTC server: A server on a network that manages an MTC device and sends and receives data to and from the MTC device.

MTC Application: An actual application (remote meter reading, tracking transport of goods, etc.) which uses an MTC device and an MTC server.

MTC Feature: Some features are required according to the functions or attributes of a network for supporting an MTC application, that is, according to the purpose of each application. Examples of which include MTC monitoring (required for remote meter reading prepared for equipment loss), low mobility (rare mobility for vending machines).

RAN: Radio Access Network. It is the generic term for 3GPP radio access such as RNC, NodeB, and eNodeB.

HLR (Home Location Register)/HSS (Home Subscriber Server): It is a database (DB) indicating subscriber information of a 3GPP network.

RANAP: It is an abbreviation of Radio Access Network Application Part. It denotes an interface between RAN and a node (MME/SGSN/MSC) which is in charge of the control of a core network.

Cell "camping on" indicates a state that the UE having completed a cell selection/reselection process selects a cell. The cell camping has been defined in 3GPP TS 36.304 v9.1.0, and thus detailed explanations thereof will be omitted.

ISR (Idle mode Signaling Reduction) indicates a service to enhance efficiency of network resources by reducing signaling for location registration when the UE moves between different access networks such as E-UTRAN and UTRAN/GERAN.

ICS (IMS Centralized Services) stably provides a consistent service to an IMS regardless of an access network to which the UE has attached (i.e., even if the UE has attached not only to IP-CAN but also to a CS domain). The ICS has been defined in 3GPP TS 23.292 v9.4.0, and thus detailed explanations thereof will be omitted.

IMS (IP Multimedia Subsystem) indicates a system for providing a multimedia service based on an IP.

Attach indicates a state that a terminal accesses a network node, which includes an attach occurring in the event of handover in a broader sense.

Hereinafter, the present invention will be explained in more detail with reference to the aforementioned technical terms.

FIG. 1 is a conceptual diagram illustrating a 3GPP service model for MTC support.

Although GSM/UMTS/EPS with the 3GPP standards for supporting MTC are defined to perform communication over a PS network, the present specification describes a method applicable to a CS network as well.

In the current technical specification, the use of an existing 3GPP bearer is suggested for the definition of the network structure. A method using a short message service (SMS) for data exchange between an MTC device and an MTC server was proposed as one of alternative solutions. The use of SMS was proposed, considering that a small amount of digital data including meter reading information and product information will be an object of an MTC application in view of the characteristics of the MTC application, by which an existing SMS method and an IMS-based SMS method can be supported.

In FIG. 1, MTCsms is a data exchange interface using an existing SMS method, and MTCi is a data exchange interface for a 3GPP bearer service and IMS.

FIG. 2 is a signal flowchart illustrating an E-UTRAN initial attach procedure as a conventional data transmission method. FIG. 2 briefly shows TS 23.401 v9.3.0 (2009-12) clause 5.3.2.1 E-UTRAN initial attach procedure, which is an example applied to EPC. As used herein, the attach procedure is generally used when initially entering an E-UTRAN cell and when attempting a connection to EPC. Also, the attach procedure may be used upon handover from non-3GPP access to E-UTRAN.

Hereinafter, explanations will be made with reference to FIG. 2. An attach request message is transmitted from a UE 10 to an MME 30 via an eNB20 (S2-1 to S2-2). An authentication procedure of the UE 10 is performed through an HHS 70 (S2-3). Location information of the UE 10 is registered in the HSS 70 (S2-4). The MME 30 sends a default bearer creation request to the S-GW 40 (S2-5), and a message for default bearer creation is exchanged between the S-GW 40 and a P-GW 50 (S2-6 and S2-8). If necessary, PCRF interaction for an operator policy is performed between the P-GW 50 and a PCRF 60 (S2-7). A default bearer is formed between the P-GW 50 and the S-GW 40, whereupon S-GW and P-GW exchange TEID for data transfer. At this point, downlink data begins to be transmitted from the P-GW 50 to the S-GW 40 unless it is an attach for handover (i.e., initial attach). The TEID (Tunneling Endpoint ID) is a parameter serving as an address for data transmission. Data transmission is possible only when TEID information is known.

An Attach access message, which contains TEID of the S-GW 40, is transmitted from the MME 30 to the eNB 20 (S2-10). Also, this message initiates a radio resource setup of a RAN zone.

Resources of a wireless zone is set up through RRC connection reconfiguration, and a setup result is transmitted to the eNB 20 (S2-11).

An Attach complete message is sent from the UE 10 to the MME 30 via the eNB 20 (S2-13 to S2-14). At this point, the eNB 20 transmits eNB TEID for downlink data reception as well. From this point, uplink data can be transmitted to the S-GW 40 via the eNB 20.

The MME 30 transmits eNB TEID to the S-GW 40 through a Modify bearer request message (S2-15). If necessary, the bearer between the S-GW 40 and the P-GW 50 is updated (S2-16 to S2-17). Afterwards, downlink data can be transmitted to the UE 10 via the eNB 20.

Later, if there is a need to store APN, PDN GW id, etc. in the HSS 70 for mobility to non-3GPP access, the MME 30 undergoes a registration process of the HSS 70 through a Notify Request message (S2-19).

FIG. 3 is a signal flowchart illustrating a tracking area update procedure (TAU procedure). FIG. 3 briefly shows TS 23.401 v9.3.0 (2009-12) clause 5.3.3.1/5.3.3.2 TAU procedure, which is an example applied to EPC. TAU is usually performed when a UE in an idle mode attempts to register a new location.

Hereinafter, explanations will be made with reference to FIG. 3. However, the S-GW/P-GW 51 is an integrated expression of the network elements of S-GW and P-GW for convenience of explanation, this expression does not limit the components and functions of a network.

A TAU request message is transmitted from the UE 10 to the MME 30 via the eNB 20 (S3-1 to S3-2).

The MME 30 sends a context request message from the corresponding UE 10 to an old MME 31, and receives context information from the corresponding UE 10, such as bearer-related information and subscriber information (S3-3 and S3-4). Then, the MME 30 transmits a context acknowledgment of a context response message to the old MME 31 (S3-6). Meanwhile, the MME 30 performs an authentication and security procedure of the UE 10 through the HHS 70 (S3-5).

Steps 7 through 9: the MME 30 sends a bearer creation request to the S-GW/P-GW 51 through a Create Session Request message. If there is no change in S-GW, the MME 30 sends an Update Bearer request message to S-GW (S3-7). If necessary, Modify bearer request/response message are exchange between S-GW and the P-GW 51 as well (not shown in FIG. 3). In the case of using a dynamic PCC, PCRF interaction for an operator policy is performed between P-GW and PCRF.

The MME 30 sends a location update request to the HSS 70 to register a new location of the corresponding UE 10 (S3-10), and the HSS 70 sends a request to the old MME 31 to delete bearer information of the corresponding UE 10 through cancel location request/response message messages (S3-11). The HSS 70 completes a new location registration process by transmitting an update location ACK to the MME 30 (S3-12). A TAU accept message is transmitted in the form of an NAS message from the MME 30 to the UE 10 via the eNB 20 (S3-13).

FIG. 4 is a signal flowchart illustrating a UE triggered service request procedure. FIG. 4 briefly shows TS 23.401 v9.3.0 (2009-12) clause 5.3.4.1 UE Triggered Service Request procedure, which is an example applied to EPC. As used herein, the UE Triggered Service Request procedure is usually performed when the UE 10 starts a new service by initiation or attempts to transmit uplink data as a paging response.

Hereinafter, explanations will be made with reference to FIG. 4.

A Service request message in the form of an NAS message is transmitted to the MME 30 via the eNB 20 (S4-1 to S4-2). Meanwhile, the MME 30 performs an authentication procedure of the UE 10 through the HHS 70.

The MME 30 initiates a radio resource setup of a RAN zone by sending an Initial Context Setup Request message using an S1-AP protocol to eNB (S4-4). At this point, TEID of the S-GW 40 for uplink data transmission is transmitted to the eNB 20. Then, a radio bearer is created in a wireless zone between the UE 10 and the eNB 20 (S4-5). From this point, the UE 10 is capable of uplink data transmission.

The eNB 20 transmits an initial Context Setup Complete message to the MME 30, and sends eNB TEID as well so as to enable downlink data transmission (S4-6).

The ENB TEID is transmitted to the S-GW 40 through a Modify bearer request, and downlink data bearer information is updated (S4-7 to S4-11). If necessary, the bearer between the S-GW 40 and the P-GW 50 is updated (S4-8 to S4-10). In the case of using a dynamic PCC, PCRF interaction for an operator policy is performed between the P-GW 50 and the PCRF 60 (S4-9).

FIG. 5 is a signal flowchart illustrating a network triggered service request procedure.

Referring to FIG. 5, when downlink data reaches the P-GW 50 from an external network, the downlink data is transmitted to the S-GW 40 (S5-1). The S-GW 40 notifies the MME 30 functioning as a control plane about the arrival of downlink data (i.e., Downlink data notification), and receives ACK from the MME 30 (i.e., Downlink data notification ACK) (S5-2).

The MME 30 sends a paging message to the eNBs 20 in the TAU list registered by the corresponding UE 10 (S5-3). Also, the respective eNBs 20 broadcast the paging message to their cell area (S5-4).

Having received the paging message, the corresponding UE 10 sends a Service request message as a response to the network (S5-5). After completion of the UE triggered Service request procedure, the S-GW 40 can transmit downlink data to the UE 10.

DISCLOSURE OF THE INVENTION

In the conventional art, in order to transmit downlink data to a UE in idle mode in a network, the processes of: 1) sending a paging message; 2) receiving a response from the UE; and 3) setup up a bearer had to be performed so that the network transmits the corresponding data to the UE.

The efficiency of resource utilization of conventional communication technologies is low, particularly, in a system where data is exchanged between an MTC device and an MTC server. That is, when the amount of data to be transmitted from the MTC server is relatively small, the bearer setup process is inefficient in terms of setup time and resource utilization.

More specifically, a conventional 3GPP system, such as GSM/UMTS/EPS, was defined for communication between end users, i.e., people. However, such a conventional mobile communication system is not efficient for communications between an MTC device and an MTC server, and is not an optimized communication solution. Accordingly, 3GPP has recently began to define the functions and mechanism for sending and receiving data between an MTC device and an MTC server, but concrete methods for them are still insufficient. Particularly, network load increase when a lot of devices in MTC simultaneously transmit small-sized data (also referred to as small data). This is because a packet data bearer setup for data transmission is required even if small-sized data (i.e., small data) is transmitted. That is, in the case of an UMTS, a PDP context activation procedure has to be performed upon data transmission after an attach procedure has been performed. Also, in the case of an EPC, a default bearer is set up in an attach procedure. After completion of the attach, a dedicated bearer setup may be additionally performed for a specific purpose. Since the conventional user data transmission method requires a packet data bearer setup as mentioned above, if a time delay for the bearer setup is large and the amount of data to be transmitted is small, there is a technical limitation that control signaling overhead is large as compared to the data amount.

Accordingly, the present invention proposes a simpler and more effective method for the transmission of small-sized data. The present invention provides a method for encapsulating MTC data on a control signal and efficiently transmitting small data, which is one of the MTC features, online and offline. However, the MTC user data, as used herein, may be actual user data (for example, reporting information collected by a device), or control data (for example, a reporting period) for MTC between an MTC device and an MTC server.

Moreover, the present invention provides a method for transmitting downlink small data prior to the bearer setup step.

Further, the present invention provides a method for broadcasting MTC data to a single UE or to UEs in a plurality of locally bounded UE groups (or an MTC group list) at a time.

To achieve these and other advantages and in accordance with the purpose of the present invention, as embodied and broadly described herein, there is provided a method for transmitting data in a mobile communication system, the method comprising the steps of: (A) receiving from a user equipment (UE) a control signaling message with MTC data encapsulated therein; (B) extracting the MTC data from the control signaling message, the control signaling message including the MTC data encapsulated therein; and (C) transmitting the extracted MTC data to an MTC server, wherein the extracted MTC data is MTC data extracted from the control signaling message including the MTC data encapsulated therein.

Preferably, the step (B) further comprises the step of determining whether the received control signaling message has encapsulated MTC data.

Preferably, in the step (B), it is checked whether an indicator indicating that the MTC data is encapsulated exists in the received control signaling message to thereby determine the presence of the encapsulated MTC data in the received control signaling message.

Preferably, in the step (B), it is checked whether a contents field of the MTC data exists in the received control signaling message to thereby determine the presence of the encapsulated MTC data in the received control signaling message.

Preferably, in the step (B), if both an indicator field indicating that the MTC data is encapsulated and a contents field of the MTC data are present in the received control signaling message, it is determined that the encapsulated MTC data is present in the received control signaling message.

Preferably, the indicator field is 'protocol discriminator', and the contents field of the MTC data is 'protocol configuration options'.

Preferably, the control signaling message is (or includes) a message on a control plane, and the control signaling message is any one of a procedure message that the UE attaches to a network, a paging response message, a location registration message, and a UE triggered service request procedure message.

Preferably, the control signaling message comprises one or both of an indicator field indicating that the MTC data is encapsulated and a contents field of the MTC data.

Preferably, the method further comprises the step of including Ack information about the MTC data when transmitting an accept or reject message to the UE in response to the control signaling message.

Preferably, the Ack information about the MTC data includes at least one of the following: information representing the successful reception of the encapsulated MTC data from the UE; information representing that the MTC data has been extracted from the received control signaling message has been transmitted to the MTC server; information confirming that the MTC server has successfully received the extracted MTC data; information that the MTC server requests the UE to re-transmit MTC data due to the failure of MTC data extraction or the like; and information to be reported to the UE.

Preferably, the method further comprises the step of receiving, from the MTC server, a response to the extracted MTC data transmitted to the MTC server.

To achieve these and other advantages and in accordance with the purpose of the present invention, as embodied and broadly described herein, there is provided a method for transmitting data in a mobile communication system, the method comprising the steps of: (a) receiving a service request message with machine type communication (MTC) data encapsulated therein from a user equipment (UE); (b) determining whether the received service request message is a message dedicated (designated or used only) for transmitting the encapsulated MTC data; (c) extracting the MTC data from the received service request message including the encapsulated MTC data; and (d) transmitting the extracted MTC data to an MTC server.

Preferably, the method further comprises the step of, if it is determined that the service request message is a message dedicated (designated or used only) for transmitting the encapsulated MTC data in the step (b), transmitting a service release command to a base station servicing the UE and thereby releasing an RRC connection between the UE and the base station.

Preferably, in the determination of the step (b), it is checked whether there is an indicator indicating that the service request message is a message dedicated for transmitting the encapsulated MTC data to thereby determine that the service request message is a dedicated message for transmitting the encapsulated MTC data.

Preferably, the service request message comprises at least one of: an indicator field indicating that the MTC data is encapsulated; and an indicator field indicating that the service request message is a message dedicated (designated or used only) for transmitting the encapsulated MTC data.

Preferably, the service request message comprises one or both of an indicator field indicating that the MTC data is encapsulated; and a contents field of the MTC data.

Preferably, the service request message comprises only a contents field of the MTC data, the contents field indicating the presence of the MTC data in the received service request message.

Preferably, the method further comprises the step of including Ack information about the MTC data when transmitting an accept or reject message or a message for releasing an RRC connection between the UE and the base station to the UE in response to the control signaling message.

Preferably, the Ack information about the MTC data includes at least one of the following: information representing the successful reception of the encapsulated MTC data from the UE; information representing that the MTC data has been extracted and transmitted the MTC server; information confirming that the MTC server has successfully received the extracted MTC data; information that the UE receives a request to re-transmit MTC data due to the failure of MTC data extraction or the like; and information to be reported to the UE.

Preferably, the method further comprises the step of receiving, from the MTC server, a response to the extracted MTC data transmitted to the MTC server.

To achieve these and other advantages and in accordance with the purpose of the present invention, as embodied and broadly described herein, there is provided a method for transmitting downlink machine type communication (MTC) data in a mobile communication system, the method comprising the steps in which: (AA) a network entity receives downlink data from an MTC server or external network node; (BB) the network entity checks whether MTC data is contained in the downlink data, and determines (or selects) a specific UE or UEs of a specific group to which the MTC data is to be transmitted; (CC) if the network entity determines UE or UEs of a specific group to which the MTC data is to be transmitted, the MTC data is encapsulated in a paging message; and (DD) the network entity transmits the paging message with the MTC data encapsulated therein to each of the base stations of the UE or UEs of the specific group so as to broadcast the paging message to the UE or UEs of the specific group.

Preferably, in the step (AA), the MTC data is included and transmitted in a downlink data notification message.

Preferably, the step (AA) comprise the steps in which: the network entity receives the downlink data notification message with the MTC data encapsulated therein from a serving gateway S-GW; and the network entity transmits a downlink data notification ACK message to the serving gateway S-GW.

Preferably, the method further comprises the step in which the network entity receives an ACK/NACK message indicative of the reception of the MTC data from the UE.

Preferably, the step (BB) further comprises the step in which the network entity selects a paging message as a control message for encapsulating and transmitting the MTC data.

Preferably, in the step (CC), the paging message comprises at least one of: an indicator field indicating that the MTC data is encapsulated in the paging message; a field indicating a specific group if the MTC data is to be transmitted to the UEs of the specific group; and a field containing a contents of the MTC data.

Preferably, the indicator field is 'message type', the field indicative of the specific group is 'MTC Group Id list', and the contents field of the MTC data is 'protocol configuration options'.

Preferably, in the step (CC), the paging message comprises only the contents field of the MTC data indicative of the presence of the MTC data.

Preferably, the downlink data notification message comprise: an indicator field indicating that the MTC data is encapsulated; and a field containing contents of the MTC data.

Preferably, the indicator field is 'cause', and the contents filed of the MTC data is 'protocol configuration options'.

Preferably, the network node is an MME (Mobility Management Entity) or SGSN (Serving GPRS Supporting Node).

To achieve these and other advantages and in accordance with the purpose of the present invention, as embodied and broadly described herein, there is provided a method for transmitting downlink MTC data in a mobile communication system, the method comprising the steps in which: (aa) a network entity receives downlink data from an MTC server or external network node; (bb) the network entity checks whether MTC data is contained in the downlink data, and thereby determines (or selects) a specific UE to which the MTC data is to be transmitted; (cc) the network entity selects a control message for transmitting the MTC data, and encapsulates the MTC data in the selected control message; and (dd) the network entity transmits therein to the specific UE the control message with the MTC data encapsulated.

Preferably, the control message is one of a TAU accept message or TAU reject message, a RAU accept message or RAU reject message, and a service request accept message or service request reject message.

Preferably, the method further comprises the step in which the network entity receives ACK/NACK message indicative of the reception of the MTC data from the UE.

Preferably, the network node is an MME (Mobility Management Entity) or SGSN (Serving GPRS Supporting Node).

Preferably, in the step (cc), the control message comprise: an indicator field indicating that the MTC data is encapsulated; and a field containing the contents of the MTC data.

Preferably, in the step (cc), the control message comprises only the contents field of the MTC data indicative of the presence of the MTC data.

To achieve these and other advantages and in accordance with the purpose of the present invention, as embodied and broadly described herein, there is provided a method for transmitting downlink machine type communication (MTC) data in a mobile communication system, the method comprising the steps in which: a user equipment (UE) receives from a network node a control message with MTC data encapsulated therein; the UE checks whether the MTC data is encapsulated in the received control message, and thereby extracts the MTC data from the control message; the UE updates configuration information based on the extracted MTC data; and the UE sends an ACK or NACK message to the network node.

Preferably, the step of extracting the MTC data comprises the steps in which: the UE checks the MTC Group Id list' parameter contained in the control message to thereby check whether the UE is a target for receiving the MTC data or corresponds to a specific UE group to which a target for receiving the MTC data belongs; and if the UE is a target for receiving the MTC data or corresponds to a specific UE group to which a target for receiving the MTC data belongs, the UE extracts the MTC data from the control message.

The present invention has the effect of optimizing radio resources and maximizing the utilization of existing procedures and messages by encapsulating small data, which is one of the MTC features, on a control signal and transmitting it online and offline.

Moreover, the present invention has the effect of reducing system load, as compared to when a conventional packet data bearer is used.

Further, the present invention makes it possible to broadcast MTC data to a selected UE or a selected group of UEs.

In addition, the present invention has the effect of reducing system load, as compared to when a conventional packet data bearer, which has to be set up first, is used.

BRIEF DESCRIPTION OF THE DRAWINGS

FIG. 6 is a flowchart illustrating a method of selecting a procedure for MTC data transmission depending on the online state or idle mode of a UE.

FIG. 7 is a table showing the configuration a TAU request message to which a method for encapsulating MTC data in a TAU request message is applied according to an embodiment of the present invention.

FIG. 8 is a table showing the value of 'Protocol indicator' indicator.

FIG. 9 illustrates the information elements of 'Protocol configuration options' field.

FIG. 13 is a flowchart illustrating that a message to be encapsulated is decided according to the state of the UE according to an embodiment of the present invention.

MTC data to the UE using downlink data in a network triggered service request procedure according to an embodiment of the present invention.

Figure 15:
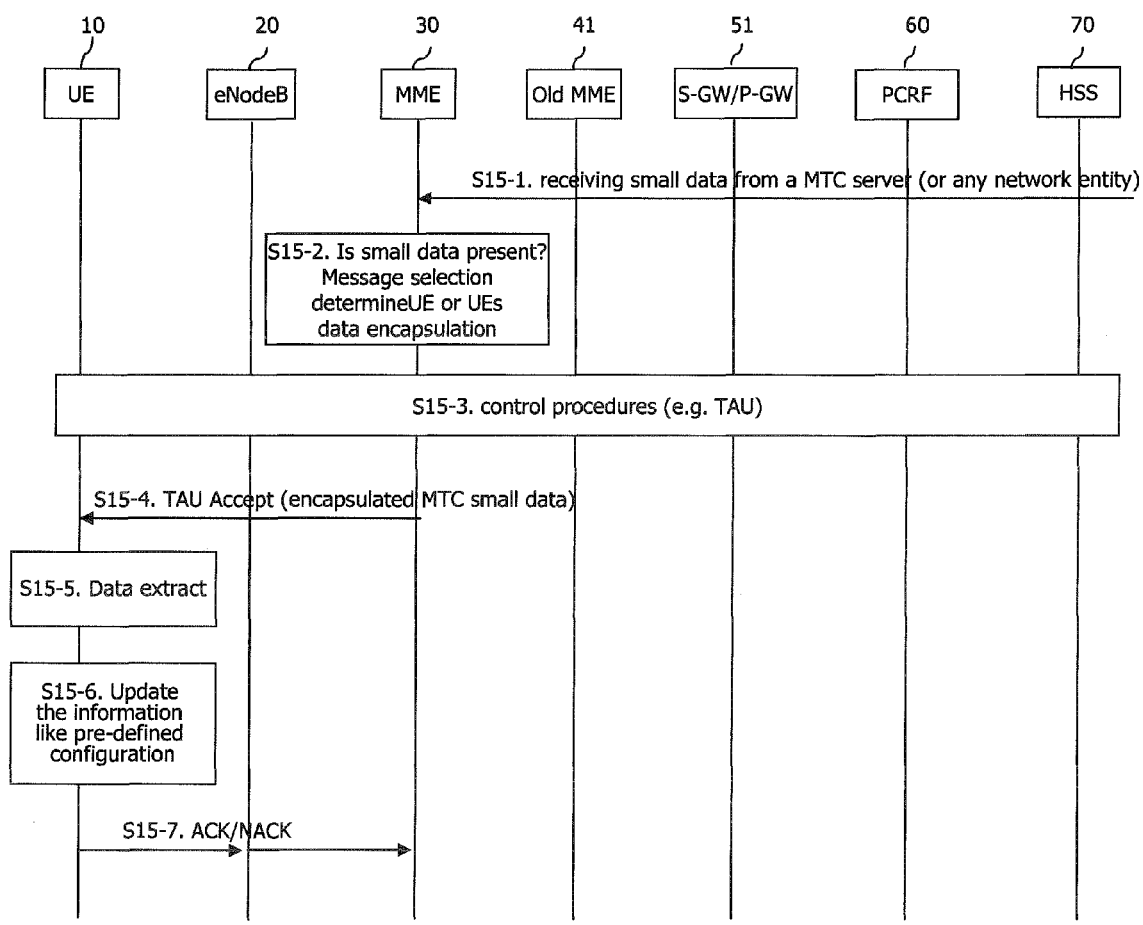

FIG. 15 is a signal flowchart showing that the network entity transmits MTC data using a TAU accept message in a TAU procedure according to an embodiment of the present invention.

MODES FOR CARRYING OUT THE PREFERRED EMBODIMENTS

The present invention is applied to a mobile communication system using MCT (machine type communication). However, the present invention is not limited to such communication systems, and it may be also applicable to next-generation mobile communications and other wired/wireless communications to which the technical spirit of the present invention is applied.

As the invention allows for various changes and numerous embodiments, particular embodiments will be illustrated in the drawings and described in detail in the written description. However, this is not intended to limit the present invention to a particular mode of practice, and it is to be appreciated that all changes, equivalents, and substitutes that do not depart from the spirit and technical scope of the present invention are encompassed in the present invention.

Though terms including ordinal numbers such as a first, a second, etc. may be used to explain various components, the components are not limited to the terms. The terms are used only for the purposed of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In a case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

A terminal according to the present invention indicates all devices which can perform the technical features of the present invention. That is, a mobile communication terminal which can perform an MTC service function according to the present invention indicates user equipment (e.g., a heartbeat sensor, an automatic vending machine, an electric power meter, an air pollution measurement device, etc.). Besides, the terminal includes not only human-oriented devices (e.g., a mobile phone, a portable phone, a DMB phone, a game phone, a camera phone, a smart phone, etc.), but also a notebook, a desktop computer, a laptop computer, a palmtop computer, a personal digital assistant (PDA), white goods, etc.

Hereinafter, preferred embodiments of the present invention will be described in detail with reference to the accompanying drawings, and the same or similar elements are designated with the same numeral references regardless of the numerals in the drawings and their redundant description will be omitted.

Figure 14:
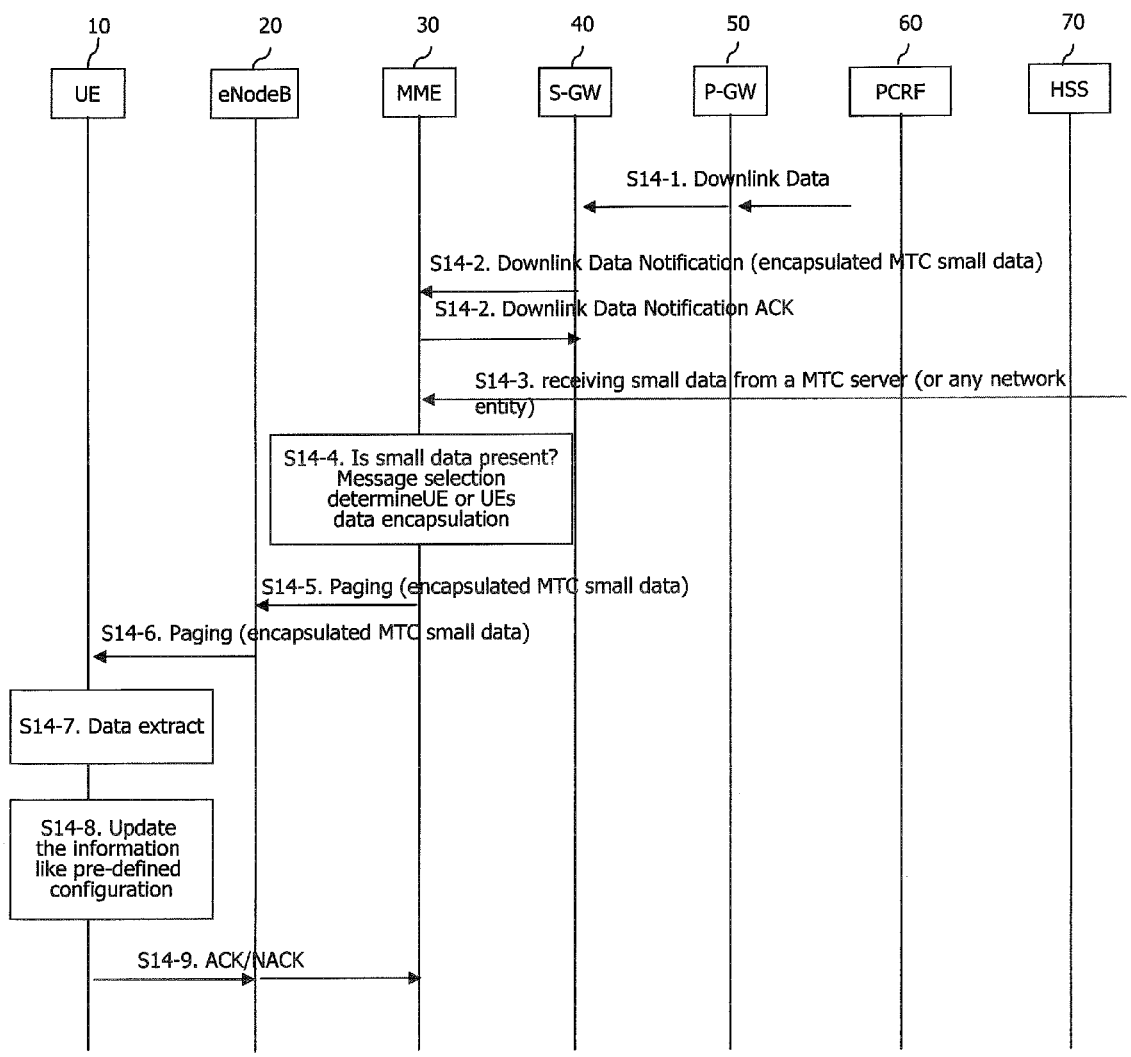
FIG. 14 is a signal flowchart showing that the network entity transmits

The embodiments of the present invention are roughly divided into two types: embodiments of FIGS. 6 to 12 in which a UE encapsulates MTC data in a control message or the like and transmits it to a network; and embodiments of FIGS. 13 to 15 in which, if downlink data received by a network from an external network contains MTC data therein, the network encapsulates the MTC data in a control message or the like and transmits it to the UE.

Regarding the embodiments of FIGS. 6 to 12, the basic concept of the present invention is to optimize network resource efficiency and reduce wireless channel load by encapsulating MTC data in an existing control procedure or control message, on a control signal, without performing packet data bearer setup, and sending the control signal having the encapsulated MTC data between a network and a UE.

An example of the present invention will be described with respect to an embodiment for encapsulating and transmitting MTC data in a location update message (e.g., TAU/RAT procedure, etc.) and an embodiment for encapsulating and transmitting MTC data in a service request message (e.g., UE triggered Service Request). In the present invention, the procedure for a UE to select MTC data (also referred to as small data) to be encapsulated, among a variety of procedures, may be pre-configured, or dynamically modified. For example, examples of a procedure or condition to be used to encapsulate MTC data that a UE is to transmit to a network are as follows: an operator policy; user, preference; user subscription; the characteristics of corresponding MTC services/applications; terminal capability; terminal status; and other radio requirements (wireless zone environment, etc.).

The present invention involves downlink transmission of MTC data from an MTC server or MME to a UE. Examples of which include: making a change to the admission of a specific MTC feature (e.g., on/off, allowed time, etc.); making a change to the reporting period during which the UE has to report to the MTC server (e.g., changing the interval at which the UE reports to the MTC server from 7 days to 15 days); status information of the MTC server; transmitting a specific error message; and downlink transmission of a specific notification or the like from the MTC server (or MME) to the UE.

Hereinafter, embodiments of FIGS. 6 to 12 will be described.

FIG. 6 is a flowchart illustrating a method of selecting a procedure for MTC data transmission depending on the online state or idle mode of a UE.

Referring to FIG. 6, assuming that data (e.g., small data indicating a report of a UE state) to be transmitted from a UE over an MTC uplink is generated (S1), the UE has to perform an attach procedure on a network unless the current UE state is the online state. Accordingly, when the UE performs an attach procedure on the network, it encapsulates MTC data and transmits it to the network (i.e., MTC server) (S2 and S3).

Meanwhile, if the UE is in the online state and the idle mode (S4), a variety of procedures may be selected. That is, if the UE performs proper TAU within a given period of time (S5), the UE shall encapsulate and transmit MTC data by using a TAU procedure (S6). On the other hand, if the UE does not perform proper TAU within the given period of time (S5), the UE initiates an SR procedure for transmitting encapsulated MTC data, transmits the MTC data, and then stops the procedure (S7 and S8). Meanwhile, if the UE is in the idle mode S4 and a normal SR occurs within a given period of time (S9), the UE can encapsulate MTC data and transmit it to the network by using an SR procedure (S10).

If the UE is not in the idle mode (S4) and a normal handover (HO) occurs within a given period of time (on the assumption that there is no PDN connectivity to the corresponding MTC server), the UE can encapsulate MTC data and transmit it to the network by using a handover procedure (S11). Meanwhile, if the UE is not in the idle mode (S4), and a normal SR occurs within a given period of time, the UE can encapsulate MTC data and transmit it to the network by using an SR procedure (S12). Hereinafter, a method for the UE to encapsulate and transmit MTC data will be concretely described. That is, an embodiment using a location update message and an embodiment using a service request message will be described.

(1) A method for encapsulating and transmitting MTC data (MTC small user data) in a Location Update message (e.g., TAU/RAT procedure) will be briefly explained.

The method of encapsulating and transmitting MTC data using a Location Update message will be useful for an MTC terminal whose location is not fixed and which has high mobility. That is, this method is suitable for when the location of a UE is updated to the network due to frequent movement. An example of which is a health care device which is to be attached to a human body.

①A UE encapsulates and transmits MTC data (i.e., MTC small data) in a TAU/RAU Request message, along with TAU/RAU-related parameters for the original purpose. However, a concrete method for encapsulating MTC data in the TAU/RAU Request message will be described below with reference to FIGS. 7 to 9.

②An SGSN/MME receives the TAU/RAU Request message from the UE, and checks whether an indicator (e.g., "Protocol discriminator" of FIG. 7) and/or a specific data field (e.g., "Protocol configuration operations") is contained in the received TAU/RAU Request message. Also, the SGSN/MME checks subscriber information to identify if the subscriber is a permitted subscriber or has the time allowed, and extracts the MTC data from the corresponding message if the subscriber is a permitted subscriber or has the time allowed.

③ The SGSN/MME forwards the extracted MTC data to the MTC server. An SMS solution of a legacy system or a conventional technique is used to perform the forwarding. Additionally, an authentication process or the requirements and capability of the UE can be checked before forwarding the extracted MTC data to the MTC server (for example, whether the UE is permitted for MTC data transmission, whether the MTC data has been sent within allowed time, and the like can be checked). Moreover, another network node (e.g., SMS server) in the SGSN/MME or EPC has to be equipped with the function of maintaining, forwarding, and retransmitting data until it receives ACK from the MTC server. The MTC encapsulated and transmitted in the TAU request message is extracted from the SGSN/MME, and then forwarded to the MTC server regardless of the success or failure of the TAU/RAU procedure.

④An acknowledgment is transmitted to the UE by using a TAU accept/reject message. As used herein, the acknowledgment refers to successful reception of the corresponding MTC data or the sending of the corresponding MTC data to the MTC server. Hereinafter, a method for sending the acknowledgment will be described with reference to Tables 1 and 2. Table 1 shows the content of a TAU accept message, and Table 2 shows additional update type information elements. A method for sensing ACK/NACK for transmitting MTC data regardless of the meaning of the TAU accept/reject message will be described as follows:

1) As shown in Table 1, the "additional update type" field of a TAU accept message can be used to indicate ACK/NACK of MTC data transmission in a broader sense;

2) As shown in the TAU request message of FIG. 7, an indicator showing that MTC data-related information is contained in "Protocol discriminator" can be sent as well;

3) A new field can be added to transmit ACK/NACK of MTC data transmission; and

4) Another new field can be added to encapsulate instructions delivered from the MTC server, changes to admission information, etc. as well as ACK/NACK.

TABLE 1

| IEI | Information Element | Type/Reference | Presence | Format | Length |
|---|---|---|---|---|---|
| | Protocol discriminator | Protocol discriminator 9.3 | M | V | ½ |
| | Security header type | Security header type 9.3.1 | M | V | ½ |
| | Tracking area update accept message identity | Message Type 9.8 | M | V | 1 |
| | EPS update result | EPS update result 9.9.3.13 | M | V | ½ |
| | Spare half octet | Spare half octet 9.9.2.9 | M | V | ½ |
| 5A | T3412 value | GPRS timer 9.9.3.16 | Q | TV | 2 |
| 60 | GUTI | EPS mobile identity 9.9.3.12 | Q | TLV | 13 |
| 54 | TAI list | Tracking area identity list 9.9.3.33 | Q | TLV | 8-98 |
| 57 | EPS beacer context status | EPS beacer context status 9.9.2.1 | Q | TLV | 4 |
| 13 | Location area identification | Location area identification 9.9.2.2 | Q | TV | 6 |
| 23 | MS identity | Mobile identity 9.9.2.3 | Q | TLV | 7-10 |
| 53 | EMM cause | EMM cause 9.9.3.9 | Q | TV | 2 |
| 17 | T3402 value | GPRS timer 9.9.3.16 | Q | TV | 2 |
| 59 | T3423 value | GPRS timer 9.9.3.16 | Q | TV | 2 |
| 4A | Equivalent PLMNs | PLMN list 9.9.2.8 | Q | TLV | 5-47 |
| 34 | Emergency number list | Emergency number list 9.9.3.87 | Q | TLV | 5-50 |
| 64 | EPS network feature support | EPS network feature support 9.9.3.12A | Q | TLV | 3 |
| F | Additional update result | Additional update result 9.9.3.0A | Q | TV | 1 |

TABLE 2

| 8 | 7 | 6 | 5 | 4 | 3 | 2 | 1 | | |
|---|---|---|---|---|---|---|---|---|---|
| Additional update type |E| | | | 0 Spare | 0 Spare | 0 Spare | AUTV | octet 1 |

Hereinafter, a method for encapsulating MTC data will be described in detail.

FIG. 7 is a table showing the configuration of a TAU request message to which a method for encapsulating MTC data in a TAU request message is applied according to an embodiment of the present invention.

FIG. 8 is a table showing the value of 'Protocol indicator' indicator.

FIG. 9 illustrates the information elements of 'Protocol configuration options' field.

The details of a packet field of the TAU request message has been defined in TS 24.301, TS 24.007, and TS 24.008, and thus detailed explanations thereof will be omitted.

The method for encapsulating MTC data in a TAU request message will now be described in three embodiments by way of example. Hereinafter, explanations will be made with reference to FIGS. 7 to 9:

1. When an indicator field and a contents field are encapsulated in a TAU request message, the indicator field is an indicator showing that MTC data is contained (for example, the "Protocol discriminator" field of FIG. 7 is the corresponding indicator), and the contents field is a field (e.g., the Protocol Configuration Options" field of FIG. 7) having the contents of the MTC data.

an indicator may be a field in an existing TAU request message. For example, a specific field of an existing TAU request message may be used, or as shown in FIG. 8, a value reserved for the later use of "Protocol discriminator" (i.e., the value of "Protocol discriminator" in FIG. 8 may be '1110').

to include actual MTC data, as shown in FIG. 7, such a field as PCO (Protocol Configurations Options) is added to the TAU request message. The POC field is newly defined and included in the TAU request message. Alternatively, a new type of field may be defined, and MTC data may be included in the defined field.

2. An indicator may be discriminated through another existing flag. For example, a flag representing a version level higher than a specific value may be used as an indicator indicating that MTC data is contained.

3. When only the contents of MTC data are included, without an indicator, in the TAU request message:

For example, if there is the PCO field in the TAU request message, this indicates the presence of MTC data.

Figure 10:
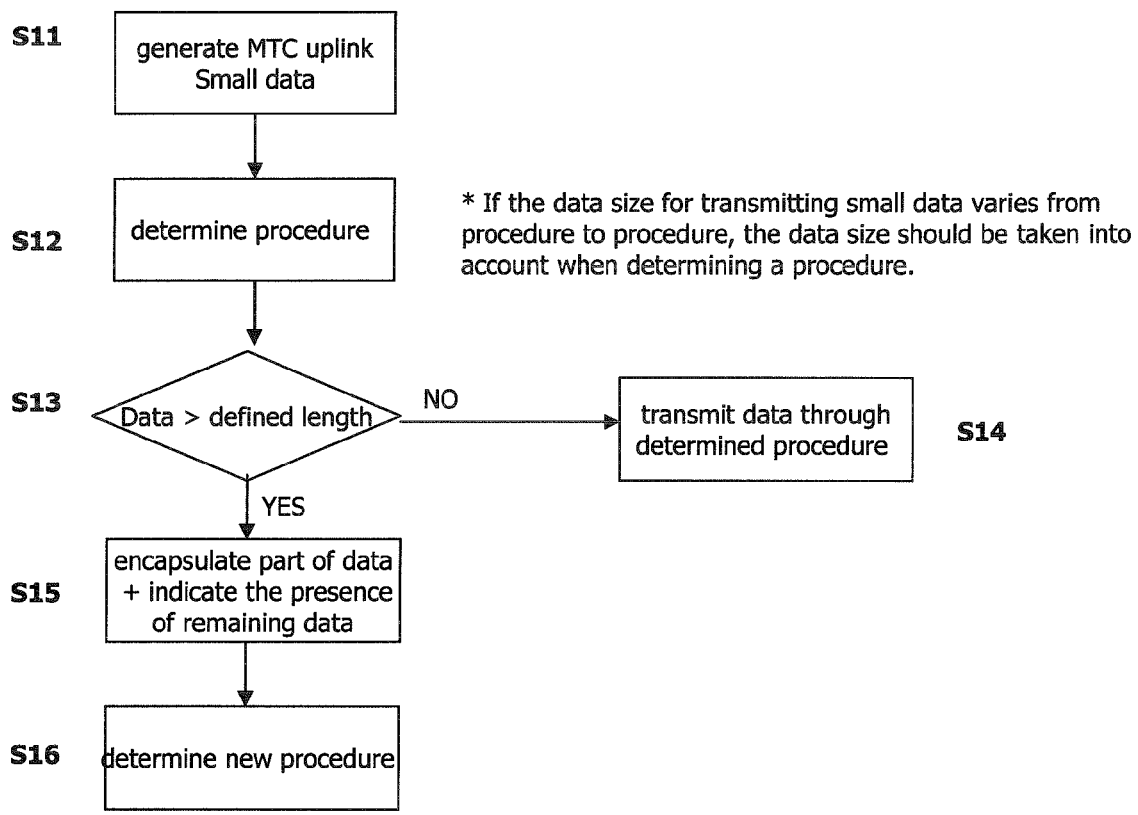
FIG. 10 is a signal flowchart showing a method for processing MTC data if the data size is larger than a defined reference length according to an embodiment of the present invention.

Meanwhile, if the size of MTC data (i.e., MTC small data) to be transmitted is larger than a defined data length, the following may occur: FIG. 9 is a table of the information elements of PCO. FIG. 9 illustrates the field ("Length of protocol ID 1 contents") representing a data length. FIG. 10 is a signal flowchart showing a method for processing MTC data if the data size is larger than a defined reference length according to an embodiment of the present invention.

When the UE generates uplink MTC data to be transmitted to a network, a procedure for transmitting the MTC data is selected (S11 and S12). At this point, if the data size for transmitting the MTC data varies from procedure to procedure, the data size should be taken into account when selecting a procedure. For example, if the size of the MTC data is larger than the capacity of the PCO field (S13), the MTC data has to be separated. Hence, there is a need to add an indicator showing that the MTC data is separated due to its size;

As the MTC is separated, there is a need to add information (or field) indicating the sequence number of the separated MTC data;

If the MTC data is separated into a plurality of parts, the MME having received it shall require the functions of detecting or reading (understanding) such an indicator and determining the corresponding subsequent operation.

Also, the MME requires an additional function of receiving and coupling the separated MTC data, and then transmitting it to the MTC server or determining whether to transmit the separated MTC data.

By additionally taking the above-mentioned conditions into account, an indicator showing that the MTC data has been separated is included, and a new procedure is selected to transmit the MTC data to a network (S15 and S16).

(2) Hereinafter, a method for encapsulating and transmitting MTC data (small user data) in a service request message (e.g., UE triggered Service Request message) according to an embodiment of the present invention will be described.

① The UE encapsulates and sends MTC data in a Service Request message. The UE may use a request message in order to transmit MTC data separately from a service request, as well as to make a request for an actual service. The embodiment described with reference to FIGS. 7 to 9 may be applied as it is to the method for encapsulating MTC data in a service request message. However, the target message is not a TAU request message, but a service request message.

② After receiving a service request message from the UE, the SGSN/MME extracts MTC data from the corresponding message. At this point, as described with reference to FIGS. 7 to 9, the SGSN/MME checks whether an indicator is present in an encapsulated service request message, and extracts MTC data at a position indicated by the indicator. If a message has been sent only to transmit MTC data using the service request message, the SGSN/MME extracts the MTC data encapsulated in the service request message, and then stops the corresponding service request procedure. Additionally, before extracting the MTC data, the SGSN/MME may check an authentication process or the requirements and capability of the UE for example, whether the UE is permitted for MTC data transmission, whether the MTC data has been sent within allowed time, and the like can be checked).

③ The SGSN/MME forwards the extracted MTC data to the MTC server. An SMS solution of a legacy system or a conventional technique is used to perform the forwarding. Additionally, an authentication process or the requirements and capability of the UE can be checked before forwarding the extracted MTC data to the MTC server (for example, whether the UE is permitted for MTC data transmission, whether the MTC data has been sent within allowed time, and the like can be checked). Moreover, another network node (e.g., SMS server) in the SGSN/MME or EPC has to be equipped with the function of maintaining, forwarding, and retransmitting data until it receives ACK from the MTC server.

④ The SGSN/MME transmits an Acknowledgment message to the UE. As used herein, the acknowledgment refers to successful reception of the corresponding MTC data or the sending of the corresponding MTC data to the MTC server. The MTC data may be forwarded to the MTC server regardless of the success or failure of the Service Request procedure.

As seen above, the method for the UE to encapsulate MTC data in a TAU/RAU procedure message and a service request message (e.g., UE triggered service request) and transmit it to a network node (e.g., SGSN or MME) has been described.

Hereinafter, a method for efficiently encapsulating and transmitting MTC data in a control signal according to the present invention will be described with reference to the signal flowcharts of FIGS. 11 and 12.

Figure 11:
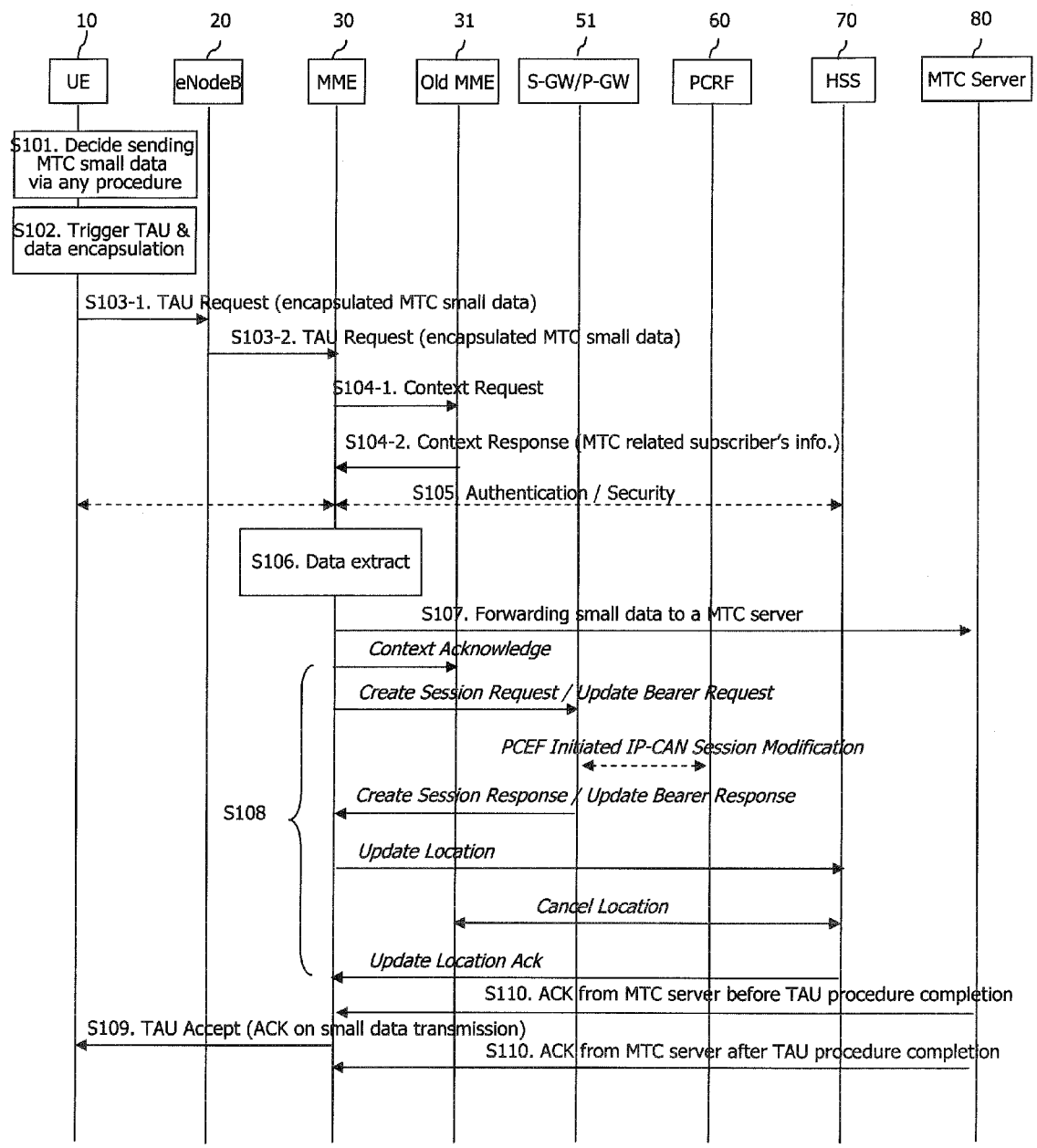
FIG. 11 is a signal flowchart illustrating a method for a UE to encapsulate MTC data and transmit it to a network using a TAU procedure according to an embodiment of the present invention.

FIG. 11 is a signal flowchart illustrating a method for a UE to encapsulate MTC data and transmitting it to a network using a TAU procedure according to an embodiment of the present invention. However, FIG. 11 is an embodiment applied to a location registration procedure according to the present invention.

Hereinafter, explanations will be made with reference to FIG. 11.

S101: when the UE has to transmit MTC data, it decides or selects a procedure for transmitting the MTC data.

The UE 10 decides to transmit MTC data (small data) to the MTC server 80 (S101). The MTC data, i.e., the UE 10, may voluntarily decide to transmit the MTC data based on pre-configured information. Alternatively, the UE 10 may receive a request from the MTC server or other network entity to transmit the MTC data to a specific MTC server 80 and transmit the MTC data.

The UE 10 determines whether to transmit MTC data through a certain message of a certain procedure (S102). FIG. 11 corresponds to an embodiment in which the UE 10 determines to use the location registration procedure (e.g. TAU (tracking area update procedure)). The determination in S102 may be made by pre-configuration or dynamically according to the type of MTC service, the characteristics of the device, or the type of subscriber information. The UE 10 triggers the start of the TAU procedure.

The condition under which the UE 10 triggers the TAU procedure has been defined in the conventional art, so detailed descriptions thereof will be omitted.

S102: the UE 10 performs TAU trigger in the TAU procedure determined in S101, and encapsulates MTC data in a TAU request message. A method for encapsulating MTC data in the TAU request message and the configuration of the message are as described with reference to FIGS. 7 to 9.

S103-1 to S103-2: The UE 10 transmits a TAU request containing encapsulated MTC data (i.e., encapsulated MTC small data) to the MME 30 via the eNB 20. As explained FIGS. 7 to 9, the TAU request message may contain an indicator (or parameter) indicating that MTC data is encapsulated and/or an indicator (or parameter) indicating that the UE 10 is an MTC device or not.

S104-1 to S104-2: the MME 30 receives context of the UE 10 from the old MME 31. At this point, a new MME 30 acquires subscriber information of the UE 10 by a context request/response process.

Moreover, the subscriber information of the UE may contain MTC-related subscriber information.

S105: the UE 10 may perform a procedure related to authentication and/or security if necessary.

S106: the MME 30 receives the TAU request message, and checks whether the TAU request message is from an MTC device and/or permitted user. Also, the MME 30 checks whether MTC data is encapsulated in the TAU request message. A method of checking whether MTC data is encapsulated is as described with reference to FIGS. 7 to 9. That is, the MME 30 may know about this through an indicator included in the TAU request message, or if no indicator is included, may know about this by checking a field with MTC data having a TAU request message structure. Meanwhile, it is possible to determine whether to check the encapsulation of MTC data based on subscriber information. Also, the process of checking the encapsulation of MTC data may be performed in parallel or together with the existing TAU procedure or independently.

As seen above, the MME 30 extracts MTC data from the TAU request message by checking an indicator or specific field included in the TAU request message.

S107: the MME 30 transmits the extracted MTC data to the MTC server 80. In step S107, the current SMS method or other transfer mechanisms can be used.

The step S107 may be performed in parallel with an existing procedure (e.g., TAU procedure), or by separate signaling (e.g., separately defined control signaling). The MME 30 can find out the address of the destination MTC server 80 by the following options: i) when the MTC device, i.e., the UE 10, sends MTC data, address information is encapsulated and transmitted as well; ii) the address may be stored as network configuration in the MME 30; and iii) when the MME 30 fetches subscriber information from the HSS 70, the address of the MTC server 80 supporting the corresponding service, along with the MTC subscriber information, may be contained.

S108: This process is a conventional TAU procedure, and performed separately from S106 and S107.

S109: the MME 30 sends a TAU accept or reject message in response to the TAU request message. When the MME 30 transmits a TAU accept or reject message to the UE 10, Ack information indicating that MTC data has been sent to the MTC server may be included and transmitted, in the TAU accept or reject message. The MME 30 proceeds to an MTC service regardless of the success or failure of the TAU procedure. This Ack information may be transmitted in the form of an indicator or in the form of data encapsulated in the TAU accept or reject message. This Ack information may indicate one of the following: 1) that the MME 30 has successfully received the encapsulated MTC data from the UE 10; 2) that the MME 30 has extracted the MTC data from the TAU request message and transmitted it to the MTC server 80; 3) that the MTC server 80 confirms the successful reception of the MTC data; 4) that the MME 30 requests the UE to perform re-transmission because of the failure of MTC data extraction or the like; 5) that downlink data transmitted from the MTC server 80 may be encapsulated and transmitted to the UE; and 6) other information to be reported.

S110: the MME 30 may receive ack from the MTC server 80 before or after sending the TAU accept or TAU reject message to the UE 10. Hence, the MME 30 may be equipped with the store and forward role, and may perform re-transmission if requested by the MTC server 80. The store and forward role for re-transmission may be performed by a third node of the network, other than the MME 30. If ACK is received from the MTC server after the TAU accept message is sent to the UE, an additional ACK message may be transmitted to the UE in a separate message.

Figure 1:
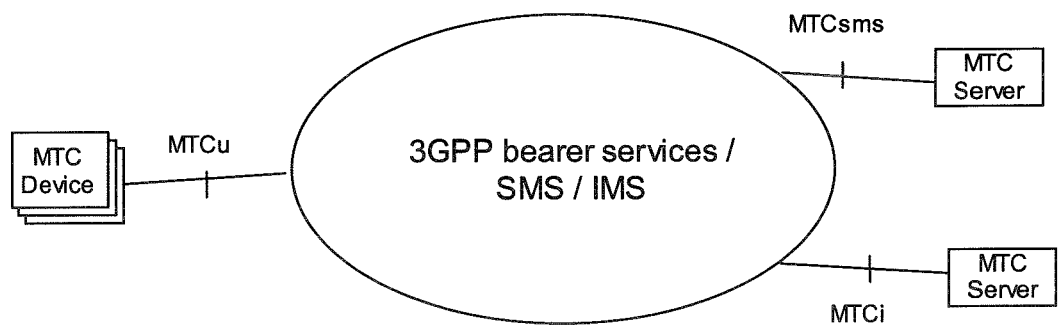
FIG. 1 is a conceptual diagram illustrating a 3GPP service model for MTC support.
Figure 2:
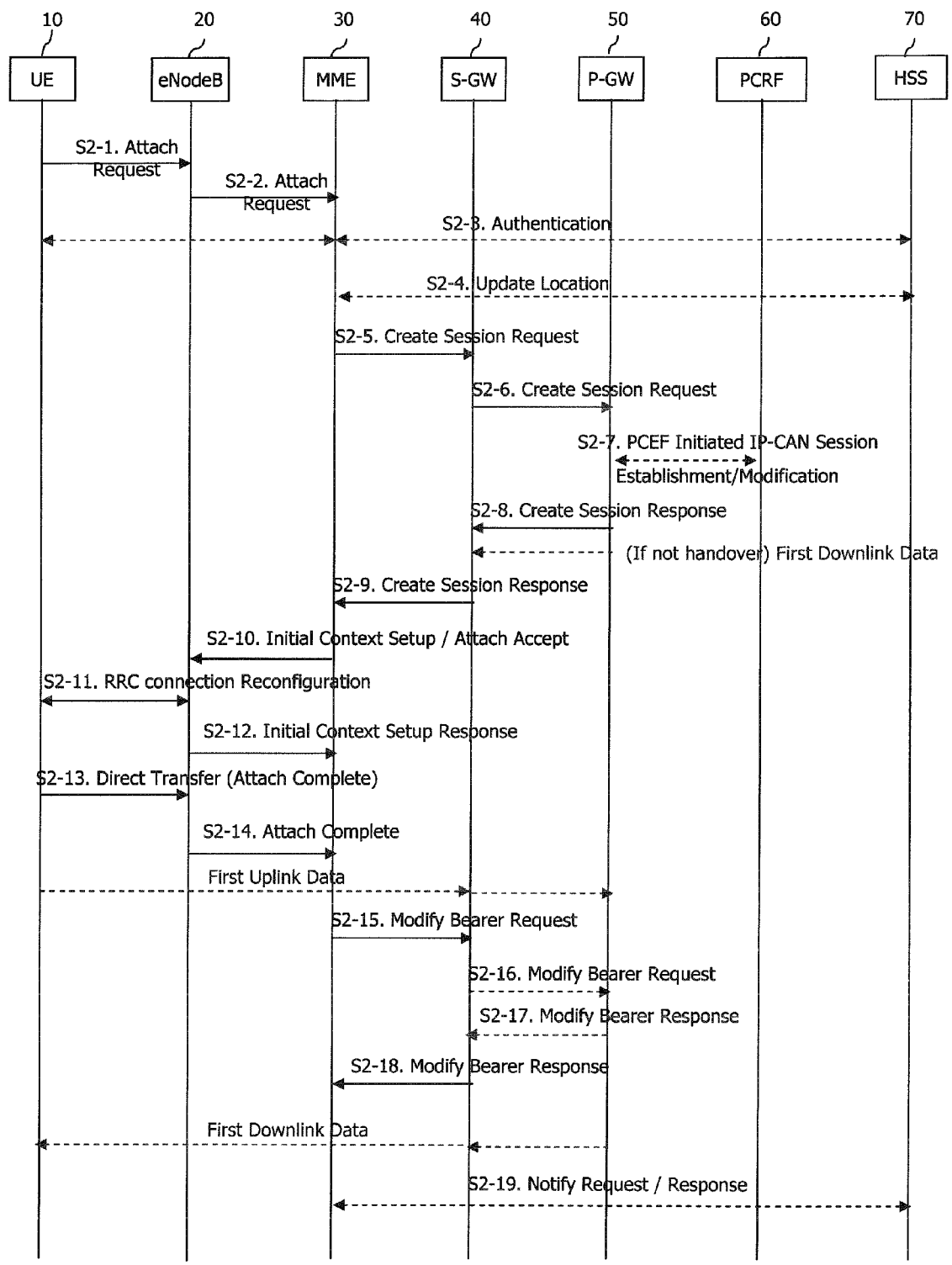
FIG. 2 is a signal flowchart illustrating an E-UTRAN initial attach procedure as a conventional data transmission method.
Figure 3:
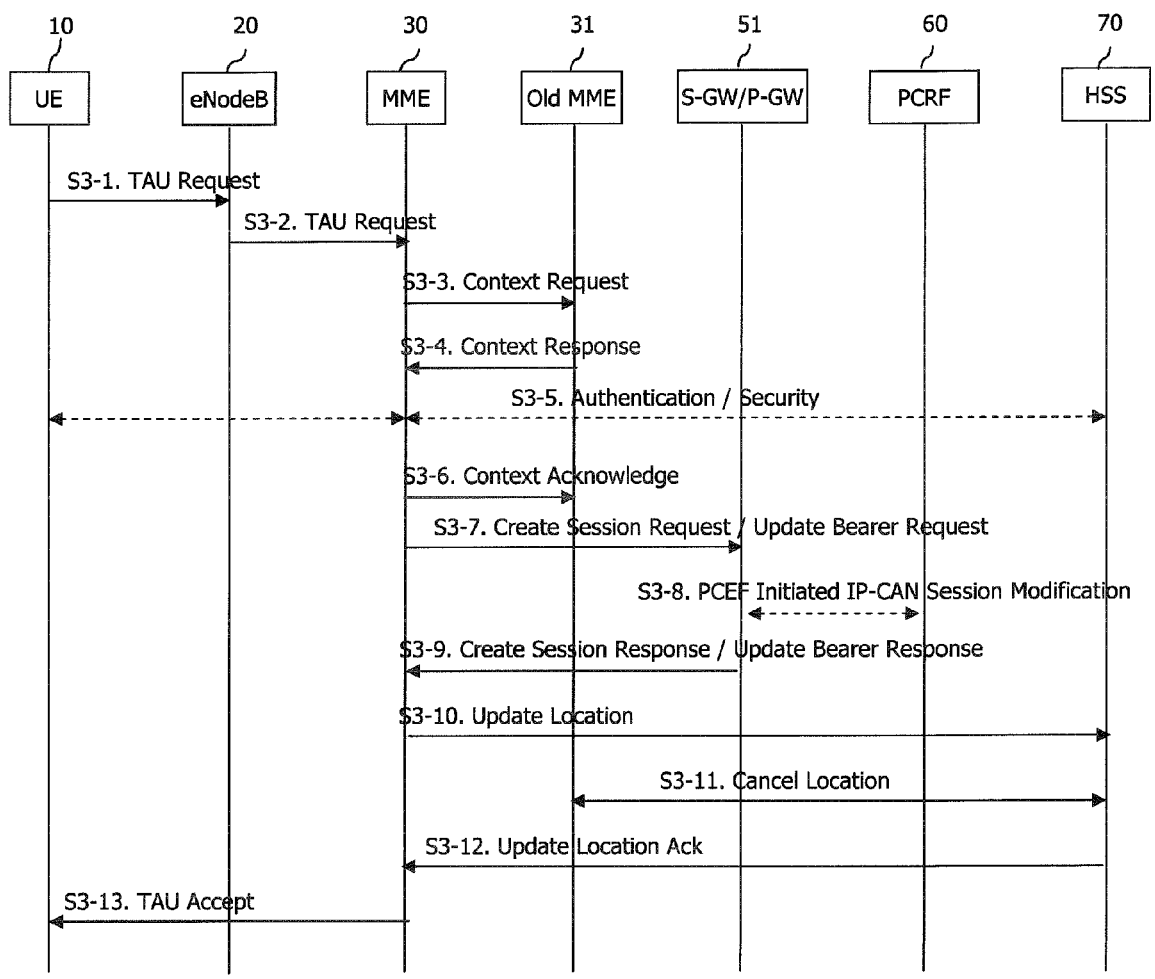
FIG. 3 is a signal flowchart illustrating a tracking area update procedure (TAU procedure).

As seen above, the embodiment of FIG. 11 involves encapsulating and sending MTC data using the TAU request message of the TAU procedure. Therefore, no additional bearer setup process such as a service request is required at a point of time for MTC data transmission after completion of the TAU procedure (FIG. 3) in the conventional art. That is, the embodiment of FIG. 11 of the present invention involves transmission of MTC small data only by a TAU procedure without an additional procedure for MTC data transmission.

Figure 12:
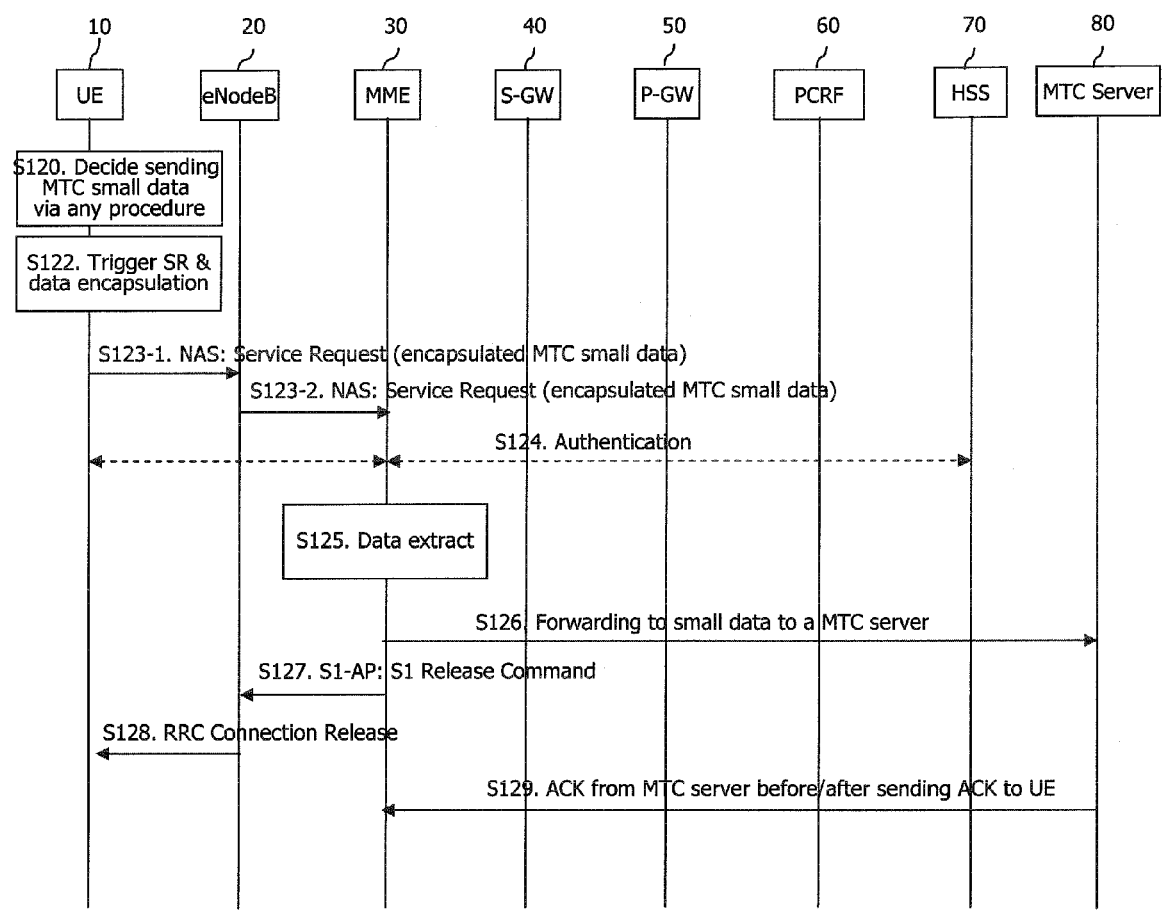
FIG. 12 is a signal flowchart illustrating a method for a UE to encapsulate MTC data and transmit it to a network using a service request procedure according to an embodiment of the present invention.

FIG. 12 is a signal flowchart illustrating a method for a UE to encapsulate MTC data and transmit it to a network by a service request procedure according to an embodiment of the present invention. However, FIG. 12 is an embodiment applied to a service request message (e.g., UE triggered service request) according to the present invention.

Hereinafter, explanations will be made with reference to FIG. 12.

S121 to S122 of FIG. 12 correspond to S101 to S102 of FIG. 11. However, the embodiment of FIG. 12 is different from that of FIG. 11 in that MTC data is encapsulated and transmitted using a service request (SR) message.

That is,

S121: when the UE has to transmit MTC data, it decides or selects a procedure for MTC data transmission The UE 10 decides to transmit MTC data (small data) to the MTC server 80 (S121). The MTC data, i.e., the UE 10, may voluntarily decide to transmit the MTC data based on pre-configured information. Alternatively, the UE 10 may receive a request from the MTC server or other network entity to transmit the MTC data to a specific MTC server 80 and transmit the MTC data.

The UE 10 determines whether to transmit MTC data through a certain message of a certain procedure (S122). FIG. 12 corresponds to an embodiment in which the UE 10 determines to use a UE triggered service request. The determination in S122 may be made by pre-configuration or dynamically according to the type of MTC service, the characteristics of the device, or the type of subscriber information. The UE 10 triggers the start of the TAU procedure.

S122: the UE 10 performs service request trigger determined in S121, and encapsulates MTC data in a service request message.

A method for encapsulating MTC data in the service request message and the configuration of the message are as described with reference to FIGS. 7 to 9. A corresponding parameter (or indicator) or field (e.g., PCO field) of the message configuration shown in FIGS. 7 to 9 may be applied to the service request message. The service request message may be used for the purpose of transmitting only encapsulated MTC data to the MME 30.

Hereinafter, a method for encapsulating MTC data in a service request message will be described in detail. Embodiments suggested in the present invention are classified into: a method using two indicators; a method using one indicator; and a method in which only the contents of MTC data is included in the service request message without the use of an indicator. Table 3 is a table showing the contents of the service request message. Hereinafter, explanations will be made with reference to Table 3.

TABLE 3

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | KSI and sequence number | KSI and sequence number 9.9.3.19 | M | V | 1 |
| | Message authentication code (short) | Short MAC 9.9.3.28 | M | V | 2 |
| 27 | Protocol Configuration Options (new defined field) | Protocol configuration options 9.9.4.11 | O | TLV | 3-253 |

The method using two indicators will be described. This method uses:

1. an indicator indicating that MTC data is included; and
2. an indicator indicative of a request message only for MTC data.

The above-mentioned two indicators may use an existing field in the service request message. That is, the existing field, e.g., "Protocol discriminator" field, may be used in an enhanced manner, or a new field may be added. The two indicators may be represented in one field with two difference values, or may be configured in two separate fields.

3. The contents of MTC data may be all included in the Service Request message. To include actual data, the PCO field is added.

The method using one indicator will be described:

1. An indicator indicating that MTC data is contained or an indicator indicative of a dedicated request message only for MTC data is used. At this point, the indicator may be an existing field in a Service Request message. For example, using a value reserved for future enhancement of the existing field, i.e., "Protocol discriminator", this service request corresponds to an indicator indicative of a message sent to transmit only MTC data Also, when using only one indicator, it is possible to determine whether there is MTC data or the indicator is a request message only for MTC data based on the contents of other fields. Moreover, when using one indicator, several meanings may be included in one field.

2. To include actual MTC data, the PCO field is added.

A method using only the contents of MTC data without an indicator will be described:

For example, if there is the PCO field, this indicates the presence of MTC data.

S123-1 to S123-2: A service request message containing encapsulated MTC data is transmitted from the UE 10 to the Mme 30 via the eNodeB. As explained with reference to Table 3, the service request message may contain a parameter or indicator for checking whether MTC data is encapsulated or whether the UE is an MTC device.

S124: the UE 10 may perform a procedure related to authentication and/or security if necessary.

S125: the MME 30 extracts MTC data. That is, the MME 30 checks whether the service request message is transmitted from a permitted (authenticated) MTC device (i.e., UE), or whether the MTC data is encapsulated. For example, the MME 30 checks the contents of the service request message shown in Table 3, performs search based on the indicator and the MTC data, and therefore perform the extraction of the encapsulated MCC data. Such a process may be performed in parallel with the existing service request procedure or independently.

S126: the MME 30 transmits the extracted MTC data to the MTC server 80:

In the step S126, the SMS method or other transfer mechanisms can be used. The MME 30 can find out the address of the destination MTC server 80 by the following options: 1) when the MTC device, i.e., the UE 10, sends MTC data, address information is encapsulated and transmitted as well; 2) the address may be stored as network configuration in the MME 30; and 3) when the MME 30 fetches subscriber information from the HSS 70, the address of the MTC server 80 supporting the corresponding service, along with the MTC subscriber information, may be contained.

If the service request message is dedicated for MTC data, the MME 30 can stop the service request message, apart from S125 and S126.

This will be described in more detail.

That is, an S1 release command is transmitted to the eNB 20. When the existing service request is performed as it is, a bearer is set up between the UE 10 and a core network (S/P-GW). However, by thusly stopping the service request procedure, MTC data for MTC service can be transmitted without a bearer setup.

Alternatively, if the purpose of the procedure is to transmit MTC data, and a Service Request is included, the conventional service request procedure may be performed separately from S125 and S126.

When the S1 release command is transmitted, or the Service Request procedure continues, one or more of the following Ack information may be included and transmitted in a Service Request accept/reject message. That is, an MTC service is conducted regardless of the success or failure of the Service Request procedure. This information can be transmitted in the form of an indicator or in an encapsulated form of MTC data. That is, examples of this information may include: i) information representing the successful reception of the encapsulated MTC data from the UE 10; ii) information representing that extracted MTC data has been transmitted to the MTC server; iii) information confirming that the MTC server 80 has successfully received the MTC data; iv) information representing that the UE receives a request to re-transmit the MTC data due to the failure of MTC data extraction or the like; v) information representing downlink user data transmitted from the MTC server; and vi) information indicating other information to be reported.

S128: the eNB 20 sends a request for RRC connection release to the UE 10.

Having received an S1 release command as a subsequent measure to the stopping of the service request procedure from the MME 30, the eNB 20 releases a connection to a wireless zone.

ACK information contained in the S1 release command may be forwarded to the UE 10.

S129: the MME 30 may receive ack from the MTC server 80 before or after sending the S1 release command/RRC connection release to the UE 10. Hence, the MME 30 may be equipped with the store and forward role, and may perform re-transmission if requested by the MTC server 80. The store and forward role for re-transmission may be performed by a third node of the network, other than the MME 30. If ACK is received from the MTC server after S124, that is, after the RRC release message is sent to the UE, an additional ACK message may be transmitted to the UE in a separate message.

Figure 4:
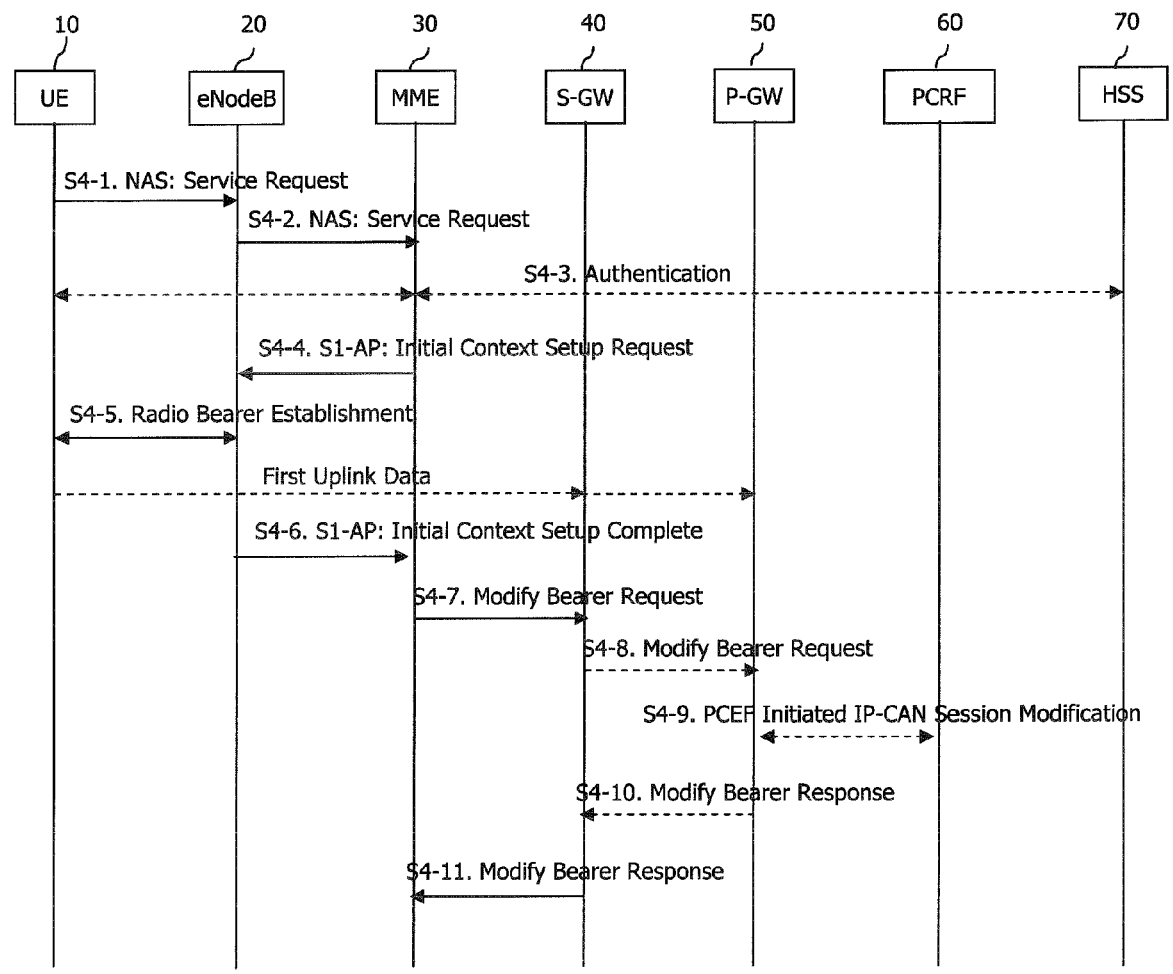
FIG. 4 is a signal flowchart illustrating a UE triggered service request procedure.
Figure 5:
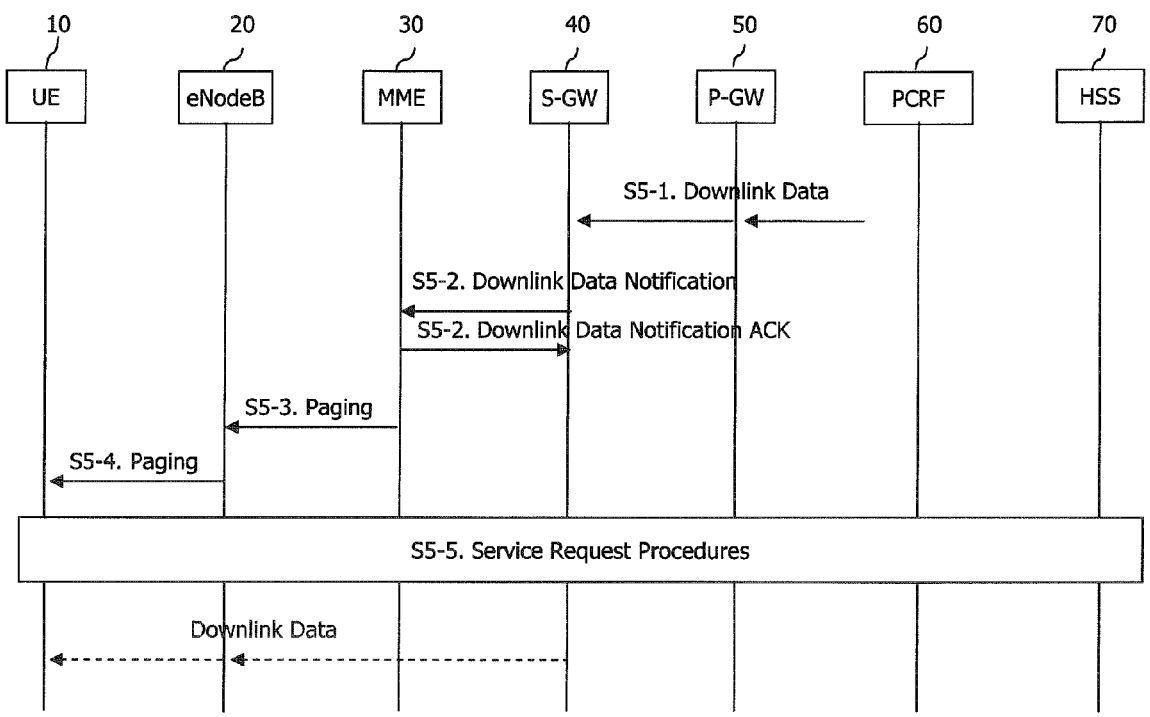
FIG. 5 is a signal flowchart illustrating a network triggered service request procedure.

As seen above, the embodiment of FIG. 12 involves transmitting MTC data through a specific control signaling message (e.g., service request message) without performing all the processes as shown in FIG. 4, as compared to the conventional service request procedure (e.g., UE triggered Service Request procedure).

Although the above-described embodiments of the present invention in conjunction with FIGS. 6 to 12 are described focusing on the process of transmitting MTC data when the UE is in the online state. The concept of MTC data encapsulation suggested in the present invention may be extensively applied to offline MTC small data transmission. That is, a method in which MTC data is encapsulate while the UE in the offline state performs an attach process or after the attach process may be applied to enable transmission to the network. As used herein, online and offline merely represent the state of the UE before MTC communication is started, and any procedure with the same concept may be applied. When the UE is in the online state, MTC data may be encapsulated and transmitted upon location update or upon a service request. When the UE is in the offline state, MTC data may be encapsulated and transmitted after establishing an attach/connection, upon location update, or upon a service request.

Hereinafter, embodiments in which the network transmits encapsulated MTC data to the UE will be described with reference to FIGS. 13 to 15.

FIG. 13 is a flowchart illustrating that a message to be encapsulated is decided according to the state of the UE according to an embodiment of the present invention.

Referring to FIG. 13, when a network entity receives downlink data containing MTC data (e.g., MTC small data whose report interval varies) from an MTC server or external network (S41), the network entity (e.g., MME) checks the MTC data to determine whether it has to be sent to UEs of a specific group (S42). If the network entity determines that the MTC data has to be sent to UEs of a specific group, the MTC data is encapsulated and transmitted in a paging message to the UEs of the specific group (S42 to S43). At this point, a paging message (i.e., a paging message with encapsulated MTC data) is sent through the base station of a corresponding cell that each of the UEs of the specific group is camping on). Meanwhile, in the case that the MTC data is not data to be sent to a specific group, if the UE is in the online state and in the idle mode (S44), a variety of procedures may be selected. That is, if the UE performs a proper TAU procedure within a given period of time (S45), the network entity shall use the TAU procedure to transmit a TAU Accept/Reject message with encapsulated MTC data to the UE via the base station (S46). On the other hand, if the network entity does not perform proper TAU with the UE within a given period of time, and an SR (service request) procedure is initiated between the network entity and the UE (S47), the network entity encapsulates the MTC data and transmits it to the UE using the Accept/Reject message of the corresponding SR procedure (S48). Meanwhile, if the TAU procedure or SR procedure is not properly performed within a given period of time, the MTC data is encapsulated in a paging message, and the paging message with the encapsulated MTC data is transmitted to the UE (S49).

If the UE is not in the idle mode (S44) and a normal handover (HO) occurs within a given period of time (on the assumption that there is no PDN connectivity to the corresponding MTC server), MTC data can be encapsulated and transmitted to the UE by using the accept/reject message of the handover procedure (S51). Meanwhile, if the UE is not in the idle mode (S44), and a normal SR occurs within a given period of time, MTC data can b encapsulated and transmitted to the UE by using the accept/Reject message of the SR procedure (S52).

Hereinafter, a method for encapsulating MTC data in a downlink data notification message will be described. Methods suggested in the present invention are classified according to whether an indicator is included or not:

(1) when an indicator field indicating that MTC data is contained and a contents field of the MTC data are contained in a downlink data notification message.

At this point, the indicator may be an existing field. That is, a value reserved for future enhancement of the existing field, e.g., "cause" may be used. Table 4 shows the IE (information elements) of the downlink data notification message. Table 5 shows the value of "cause". That is, the value of "cause" of Tables 4 and 5 may be used to indicate that MTC data is included in the downlink data notification message.

TABLE 4

| Information elements | P | Condition/Comment | IE Type | Ins. |
|---|---|---|---|---|
| Cause | O | If SGW recevies an Error indication from eNodeB/RNC, the SGW may send the Cause IE with value "Error indication received from RNC/oNodeB" to MME/S4-SGSN as specified in 3GPP TS 23.007 [17]. | Cause | 0 |
| Private Extension | O | | Private Extension | VS |
| Protocol Configuration Options (new defined field) | O | Protocol configuration options TS 24.301 9.9.4.11 | TLV | 3-253 |

TABLE 5

| | Bits | | | | | | | |
|---|---|---|---|---|---|---|---|---|
| Octets | 8 | 7 | 6 | 5 | 4 | 3 | 2 | 1 |
| 1 | Type = 2 (doctored) | | | | | | | |
| 2 to 3 | Length = n | | | | | | | |
| 4 | Spare | | | | Instance | | | |
| 5 | Cause value | | | | | | | |

TABLE 5-continued

| Octets | Bits | | | | | | | |
|---|---|---|---|---|---|---|---|---|
| | 8 | 7 | 6 | 5 | 4 | 3 | 2 | 1 |
| 6 | Spare | | | | | | | CS |
| 7 | Type of the attending IE | | | | | | | |
| 8-9 | Length | | | | | | | |
| 10 | Spare | | | | | Instance | | | to include actual MTC data, such a field as PCO may be added. Alternatively, a new type of field may be defined. As used herein, PCO is a field type defined in the conventional art. However, PCO is not included in TAU in the conventional art.

(2) Only the contents of MTC data may be included in the downlink data notification message without an indicator.

For example, if there is the PCO field, this indicates the presence of MTC data. This is not to add an actual PCO field but to add a field that can be attached to data along with the PCO type.

Hereinafter, the network entity (e.g., MME) receives a downlink data notification message containing MTC data, checks the indicator and/or the contents field of the MTC data, and determines which control message is to be use to transmit encapsulated MTC data.

In the present invention, the procedure for a UE to select MTC data (also referred to as small data) to be encapsulated, among a variety of procedures, may be pre-configured, or dynamically modified. For example, examples of a procedure or condition to be used to encapsulate MTC data that a UE is to transmit to a network are as follows: an operator policy; user preference; user subscription; the characteristics of corresponding MTC services/applications; terminal capability; terminal status; and other radio requirements (wireless zone environment, etc.).

Hereinafter, a method for the network entity (e.g., MME) to encapsulate MTC data in a control message (e.g., a paging message, a TAU procedure message, a service request message, etc.) and transmit it to the UE (or UEs of a specific group will be described. However, an example of the paging message and an example of the use of the TAU procedure message will be described according to an embodiment of the present invention.

1. When using a paging message:

This method is a method for encapsulating MTC data in a paging message. Table 6 shows the configuration of the paging message. Explanations will be made with reference to "message type?" field, "MTC Group Id list", and the PCO (Protocol Configuration Options) field.

① A method for including an indicator showing that MTC small data is contained and the contents of small data. That is, the Message type?" field predefined in the paging message is used to define a new indicator, and a new field is additionally designated to include MTC data.

② When a specific MTC device group id is included. That is, a new field may be defined similarly to a TAI list and a CSG list.

③ Only the contents of MTC data may be contained in the paging message without the use of an indicator.

For example, if there is the PCO field, this indicates the presence of MTC data.

TABLE 6

| IE/Group Name | Presence | Range | IE type and reference | Semantics description | Critically | Assigned Critically |
|---|---|---|---|---|---|---|
| Message Type | M | | 9.2.1.1 | | YES | Ignore |
| UE Identity Index Value | M | | 9.2.3.10 | | YES | Ignore |
| UE Paging Identity | M | | 9.2.3.13 | | YES | Ignore |
| Paging DRX | O | | 9.1.16 | | YES | Ignore |
| CN Domain | M | | 9.2.3.22 | | YES | Ignore |
| List of TAIs | M | | | | YES | Ignore |
| >TAI List Item | | 1 to <maxnoofTAIs> | | | EACH | Ignore |
| >>TAI | M | | 9.2.3.16 | | — | |
| CSG Id List | | 0 to <maxnoofCSGId> | | | GLOBAL | Ignore |
| >CSG Id | M | | 9.2.1.62 | | | |
| MTC Group ID List (New defined field) | O | 0 to <maxnoofMTCId | | | | |
| Protocol Configuration Options (new defined field) | O | | | Protocol configuration options TS 24.301 9.9.4.11 | | |

2. When MTC data is encapsulated using an ACCEPT or REJEC message. Table 7 shows the contents of a TAU (Tracking Area Update Accept) message. Hereinafter, explanations will be made with reference to Table 7.

In this embodiment, MTC data may be encapsulated and sent in an accept/reject message for the TAU request message, and ACK/NACK for MTC data may be sent regardless of the meaning of an accept/reject message for the TAU request message.

① A method for including an indicator showing that MTC data is contained and the contents of small data.

A. As in the TAU request message, an indicator showing that "Protocol discriminator" MTC data-related information is contained can be sent as well.

B. A new field may be additionally designated to encapsulate instructions from the MTC server or a change to admission information.

② when only the contents of MTC data are included without the use of an indicator. For example, if there is the PCO field, this indicates the presence of MTC data.

TABLE 7

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Tracking area update accept message identity | Message type 9.8 | M | V | 1 |
|  | EPS update result | EPS update result 9.9.3.13 | M | V | ½ |
|  | Spare half octet | Spare half octet 9.9.2.9 | M | V | ½ |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | B-98 |
| 67 | EPS bearer contact status | EPS bearer contact status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.18 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 84 | EPS network feature support | EPS network feature support 9.9.3.12A | O | TLV | 3 |
| F | Additional update result | Additional update result 9.9.3.0A | O | TV | 1 |
| 27 | Protocol Configuration Options (new defined field) | Protocol configuration options 9.9.4.11 | O | TLV | 3-253 |

Hereinafter, the UE extracts MTC data from a received paging message or Accept message (or Reject message), and updates pre-configuration information based on the contents of the MTC data. The updated pre-configuration may be used for MTC-related actions later.

Meanwhile, the UE may transmit ACK/NACK to the MME through a separate procedure. At this point, a newly defined message may be used, or another control procedure may be used, or a UE triggered service request procedure may be used to transmit only ACK/NACK and then terminate the corresponding procedure.

Hereinafter, embodiments of the present invention will be described with reference to FIGS. 14 and 15.

FIG. 14 is a signal flowchart showing that the network entity transmits MTC data to the UE using downlink data in a network triggered service request procedure according to an embodiment of the present invention.

The MME 30 receives downlink small data from the MTC server (not shown) or a third network node (S14-1 to S14-3). That is, the S-GW 40 receives the downlink data via the P-GW 50 (S14-1). The S-GW 40 sends a downlink data notification to the MME 30 (S14-2). Then, the S-GW 40 receives a downlink data notification ACK from the MME 30 (S14-2). The downlink data, of S14-1 may contain encapsulated MTC data. Also, the downlink data notification message of S14-2 may contain encapsulated MTC data. A method for encapsulating MTC data in the message is as described with reference to Tables 4 to 7. That is, as described with reference to Tables 4 and 5, in the downlink data notification message, the 'cause' field can be used as an indicator (that is, an indicator indicating that MTC data is contained), and the PCO field can be used as the contents field of the MTC data. Meanwhile, if the downlink data of S14-1 contains no encapsulated MTC data, the MME 30 having received a downlink data notification determines that small data encapsulation is required based on subscriber information or other information received from the UE or other network nodes, so that the MME 40 can send a request to the S-GW 40 to send encapsulated data when notifying the S-GW 40 of downlink data notification ACK. Having received this ACK, the S-GW 40 can include encapsulated MTC data in the downlink data notification message of S14-2 and send it to the MME 30. That is, the step S14-2 may be performed again, or a new message may be defined to define an additional step.

Meanwhile, the MME 30 may directly receive MTC data from the MTC server (not shown) or other network entities (S14-3).

The MME 30 confirms the presence of MTC data, selects a control message to transmit MTC data, encapsulates the MTC data in the selected control message, and selects a UE or UEs of a specific group to which the MTC data is to be transmitted (S14-4).

The step S14-4 will be described below in more detail.

The MME 30 determines whether MTC data is contained in the downlink data notification message. At this point, if an indicator (e.g., 'cause? Field' of Table 4) is included, the 'cause' indicator is identified to check the MTC data of the PCO field. Meanwhile, if no indicated is used in the downlink data notification message, the MME 30 shall identify MTC data by checking the MTC data contained in the PCO field.

The MME 30 extracts the MTC data contained in the downlink data notification data, and then selects a control message (e.g., a paging message or TAU Accept/Reject message) to be transmitted to the UE 10. The embodiment of FIG. 14 corresponds to the case in which the MME 30 selects a paging message to transmit the MTC data to the UE 10.

Also, the MME 30 may determine a specific UE or UEs of a specific group to which the MTC data is to be transmitted. At this point, the MME 30 may determine a target UE and/or UE group to which the MTC data is to be transmitted, by taking into account: an operator policy; user preference; user subscription; the characteristics of corresponding MTC services/applications; terminal capability; terminal status; and other radio requirements (wireless zone environment, etc.).

The MME 30 encapsulates the MTC data in the selected control message (paging message in the case of FIG. 14) and transmits it to the eNodeB 20. A method for encapsulating the MTC data in the paging message will be described with reference to Tables 6 and 7. That is, as shown in Table 6, 'message type?' field, 'MTC Group Id list; field, and PCO field may be used.

The MME 30 transmits a paging message with encapsulated MTC data to the eNodeB 20 (S14-5). At this point, when transmitting the paging message to UEs of a specific group, the MME 30 transmits the paging message to the base station of a cell that each of the UEs is camping on, and the base station of each cell transmits it to the corresponding UEs (S14 to S16). The UEs of the specific group may camp on the same cell. In this case, the eNodeB 20 may broadcast the paging message with encapsulated MTC data to the UE 10.

As shown in the step s14-3, when downlink MTC data transmitted from the MTC server has reached the eNodeB 20, the eNodeB 20 may perform the function and determination of S14-4 (that is, determination of a UE or group to which MTC data is to be transmitted, encapsulation of MTC data, and the like) in place of the MME 30.

Having received the paging message, the UE 10 checks the indicator (e.g., the 'message type' or PCO field) of the paging message to extract MTC data (S14-7). At this point, the UE 10 checks the 'MTC Group Id list' to identify whether the MTC data corresponds to itself or the specific UE group and extract it.

The UE 10 updates pre-configuration information or the like based on the extracted MTC data (S14-8). That is, the UE 10 may update pre-configuration information, if necessary, in order to reflect an instruction or notification, e.g., from the MTC server based on the MTC data. For example, the UE 10 performs later actions based on the updated configuration information (e.g., if the reporting interval has been changed, the UE reports every changed interval).

The UE 10 sends ACK/NACK indicative of the reception of MTC data to the MME 30 via the eNodeB 20. At this point, the UE 10 may send ACK/NACK in a separate message or another control signaling message of a separate procedure, or by using the UE triggered service request message. In the case of using the UE triggered service request procedure, the corresponding procedure is stopped after encapsulating and sending only ACK/NACK.

Hereinafter, embodiments of the present invention will be described with reference to FIG. 15.

FIG. 15 is a signal flowchart showing that the network entity transmits MTC data using a TAU accept message in a TAU procedure according to an embodiment of the present invention.

The MME 30 receives downlink small data from the MTC server (not shown) or a third network node (e.g., SMS server) (S15-1). The downlink data of S15-1 may contain encapsulated MTC data. A method for encapsulating MTC data in the message is as described with reference to Tables 4 and 5.

The MME 30 confirms the presence of MTC data, selects a control message to transmit MTC data, encapsulates the MTC data in the selected control message, and selects a UE or UEs of a specific group to which the MTC data is to be transmitted (S15-2). If MTC data is encapsulated in the downlink data received in the step S15-1, the MME 30 extracts it.

The step S15-2 is identical to the operation of S14-4 of FIG. 14. However, in S15-2, the control message selected by the MME 30 to transmit the MTC data is a location registration procedure (e.g., TAU procedure) message. Accordingly, a detailed operation of S15-2 of FIG. 15 has been defined in the description of S14-4 of FIG. 14, so detailed descriptions thereof will be omitted. Hereinafter, the operation of the MME 30 in S15-2 will be described in brief. If the location registration procedure (e.g., TAU procedure) is being performed, the MME 30 selects a TAU procedure control message, and selects a UE or UEs of a specific group to which the MTC data is to be transmitted. At this point, the MME 30 may determine a target UE and/or UE group to which the MTC data is to be transmitted, by taking into account: an operator policy; user preference; user subscription; the characteristics of corresponding MTC services/applications; terminal capability; terminal status; and other radio requirements (wireless zone environment, etc.).

When the control procedure (e.g., TAU/RAU, service request procedure, handover, etc.; TAU procedure in FIG. 15) is performed, and the network transmits a TAU accept/reject message to the UE (S15-3), the MME 30 encapsulates the MTC data in a paging message and transmits it to the UE 10 (S15-4). A method for encapsulating MTC data in a paging message will be described with reference to Tables 6 and 7.

Having received the TAU accept message, the UE 10 checks the indicator (e.g., the 'message type' indicator explained in FIG. 14) or the PCO field to extract MTC data (S15-5).

The UE 10 updates pre-configuration information or the like based on the extracted MTC data (S15-6). That is, the UE 10 may update pre-configuration information, if necessary, in order to reflect an instruction or notification, e.g., from the MTC server based on the MTC data. For example, the UE 10 performs later actions based on the updated configuration information.

The UE 10 sends ACK/NACK indicative of the reception of MTC data to the MME 30 via the eNodeB 20. At this point, the UE 10 may send ACK/NACK in a separate message or another control signaling message of a separate procedure, or by using the UE triggered service request message. In the case of using the UE triggered service request procedure, the corresponding procedure is stopped after encapsulating and sending only ACK/NACK.

As seen from above, although the above-described embodiments of the present invention have been described with respect to E-UTRANS/EPS, they may be applied to the corresponding procedure with the same purpose of an existing 3GPP system (legacy 3GPP system).

The method according to the present invention described herein may be implemented using software, hardware or a combination thereof. For instance, the method may be implemented as codes or commands within a software program that can be stored in a storage medium (e.g., an internal memory of a mobile terminal, a flash memory, a hard disc, etc.) and that can be executed by a processor (e.g., an internal micro processor, controller, etc. of a mobile terminal).

Although the present invention has been described with reference to the embodiments illustrated in the accompanying drawings, the embodiments are only illustrative. Those skilled in the art will appreciate that various modifications and other equivalent embodiments can be made based on the embodiments. Accordingly, the true technical scope of the present invention should be defined by the technical spirit of the attached claims.

The invention claimed is:

1. A method for transmitting downlink machine type communication (MTC) data, performed by a network entity in a mobile communication system, the method comprising:
   (aa) receiving downlink data which contains a MTC data from an MTC server or external network node;
   (bb) determining, by checking the MTC data, whether the MTC data is to be transmitted to a specific user equipment (UE) or to UEs of a specific group;
   (cc) if the MTC data is to be transmitted to the specific UE being in an online state, selecting one of: a TAU (Tracking Area Update) accept message, a TAU reject message, a RAU (Routing Area Update) accept message, a RAU reject message, a SR (service request) accept message, a SR reject message, a HO (handover) accept message, a HO reject message, and a paging message as a control message for transmitting the MTC data according to a state of the specific UE;
   (dd) encapsulating the MTC data in the selected control message; and
   (ee) transmitting to the specific UE the control message with the MTC data encapsulated therein.

2. The method of claim 1, wherein, in operation (cc), if the specific UE is an idle mode and performs a TAU or RAU procedure within a given period of time, one of: a TAU accept message, a TAU reject message, a RAU accept message, and a RAU reject message is selected as the control message for transmitting the MTC data.

3. The method of claim 1, wherein, in operation (cc), if the specific UE is in an idle mode and a SR procedure between the network entity and the specific UE is initiated within a given period of time, a SR accept message or a SR reject message is selected as the control message for transmitting the MTC data.

4. The method of claim 1, wherein, in operation (cc), if the specific UE is not in an idle mode and a HO procedure occurs within a given period of time, a HO accept message or a HO reject message is selected as the control message for transmitting the MTC data.

5. The method of claim 1, wherein the control message comprises:
   an indicator field indicating that the MTC data is encapsulated; and
   a field containing contents of the MTC data.

6. The method of claim 1, wherein the control message comprises only the contents field of the MTC data indicating the presence of the MTC data.

7. The method of claim 1, further comprising:
   if the network entity determines that the MTC data is to be transmitted to the UEs of the specific group in operation (bb);
   selecting a paging message to be broadcasted to the UEs of the specific group as the control message for transmitting the MTC data; and
   transmitting the paging message with the MTC data encapsulated therein to each of the base stations of the UEs of the specific group to broadcast the paging message to the UEs of the specific group, the transmitting the paging message with the MTC data encapsulated therein being initiated without any request from one of the UEs of the specific group.

8. The method of claim 7, wherein the paging message comprises at least one of:
   an indicator field indicating that the MTC data is encapsulated in the paging message;
   a field indicating a specific group if the MTC data is to be transmitted to a UE or UEs of the specific group; and
   a field containing a contents of the MTC data.

9. The method of claim 8, wherein:
   the indicator field is "message type";
   the field indicating the specific group is "MTC Group Id list"; and
   the contents field of the MTC data is "protocol configuration options".

10. The method of claim 1, wherein the network node is a Mobility Management Entity (MME) or a Serving GPRS Supporting Node (SGSN).

11. The method of claim 1, further comprising receiving from the specific UE an ACK/NACK message, the ACK/NACK message indicating the reception of the MTC data.

12. The method of claim 1, wherein, in operation (aa), the MTC data is included and transmitted in a downlink data notification message.

13. The method of claim 1, wherein operation (aa) further comprises:
   receiving the downlink data notification message with the MTC data encapsulated therein from a serving gateway S-GW; and
   transmitting a downlink data notification ACK message to the serving gateway S-GW.

14. The method of claim 1, wherein operation (aa) further comprises:
   requesting the serving gateway S-GW to transmit a downlink data notification message with the MTC data encapsulated therein through a downlink data notification ACK message;
   receiving from the serving gateway S-GW the downlink data notification message with the MTC data encapsulated therein; and
   transmitting the downlink data notification ACK message to the serving gateway S-GW.

15. The method of claim 13, wherein the downlink data notification message comprises:
   an indicator field indicating that the MTC data is encapsulated; and
   a field containing contents of the MTC data.

16. The method of claim 14, wherein the downlink data notification message comprises:
   an indicator field indicating that the MTC data is encapsulated; and
   a field containing contents of the MTC data.

17. The method of claim 15, wherein the indicator field is "cause", and the contents filed of the MTC data is "protocol configuration options".

18. The method of claim 16, wherein:
   the indicator field is "cause"; and
   the contents filed of the MTC data is "protocol configuration options".

19. A method for transmitting uplink machine type communication (MTC) data, performed by a user equipment (UE) in a mobile communication system, the method comprising:
   checking whether the UE is in an online state or an offline state;

selecting an attach request message as a control message for transmitting a MTC data if the UE is in the offline state, or selecting one of: a TAU (Tracking Area Update) request message, a RAU (Routing Area Update) request message, and a SR (service request) message as the control message for transmitting the MTC data if the UE is in the online state;

encapsulating the MTC data in the selected control message; and transmitting the control message with the MTC data encapsulated therein to a network entity.

* * * * *